US012803842B2

(12) United States Patent
Moses et al.

(10) Patent No.: US 12,803,842 B2
(45) Date of Patent: Nov. 17, 2026

(54) SUCCESSIVE DIGITAL POST DISTORTION CORRECTION

(71) Applicant: QUALCOMM Incorporated, San Diego, CA (US)

(72) Inventors: Amit Moses, Tel Aviv (IL); Ronen Shaked, Kfar Saba (IL); Yaniv Eistein, Tel Aviv (IL); Aviv Regev, Tel Aviv (IL)

(73) Assignee: QUALCOMM Incorporated, San Diego, CA (US)

(*) Notice: Subject to any disclaimer, the term of this patent is extended or adjusted under 35 U.S.C. 154(b) by 210 days.

(21) Appl. No.: 18/440,622

(22) Filed: Feb. 13, 2024

(65) Prior Publication Data

US 2025/0260599 A1 Aug. 14, 2025

(51) Int. Cl.
*H04L 25/02* (2006.01)
*H04W 72/12* (2023.01)
*H04W 72/20* (2023.01)

(52) U.S. Cl.
CPC ......... *H04L 25/0202* (2013.01); *H04W 72/12* (2013.01); *H04W 72/20* (2023.01)

(58) Field of Classification Search
CPC .... H04L 25/0202; H04W 72/20; H04W 72/12
See application file for complete search history.

(56) References Cited

U.S. PATENT DOCUMENTS

2016/0079933 A1* 3/2016 Fehri ......................... H03F 3/19 330/75
2019/0095754 A1* 3/2019 Chen ................. G06F 18/21342
2019/0273531 A1* 9/2019 Waxman ................ H04B 1/715
2019/0386865 A1* 12/2019 Mochizuki ........... H04B 7/0452
2020/0405124 A1* 12/2020 Sonnenborg ..... A61B 1/000095
2021/0152254 A1* 5/2021 Duthel .................... H04B 10/58
2023/0291628 A1* 9/2023 Gong .................. H04L 27/2623
2024/0243838 A1* 7/2024 Farhadi ................ H04B 1/0475
2025/0030580 A1* 1/2025 Behravan .............. H03F 1/3282
2025/0105866 A1* 3/2025 Barbu ...................... H03F 3/245

OTHER PUBLICATIONS

Demir O.T., et al., "The Bussgang Decomposition of Nonlinear Systems", Basic theory and MIMO extensions [lecture notes], IEEE Signal Processing Magazine, vol. 38, No. 1, 2020, Jan. 2021, pp. 131-136.

* cited by examiner

*Primary Examiner* — Andrew Lee
(74) *Attorney, Agent, or Firm* — Holland & Hart LLP

(57) ABSTRACT

Methods, systems, and devices for wireless communication are described. A user equipment (UE) may transmit a capability message to a network entity indicating a capability of the UE to perform a successive non-linear distortion correction process. The UE may also transmit a control message indicating a quantity of parallel processes supported at the UE and associated with each of a quantity of sub-iterations of the successive non-linear distortion correction process. The network entity may transmit, and the UE may receive, based on the control message, a scheduling configuration message indicating a schedule for performing respective subsets of a set of non-linear estimation processes during each sub-iteration of the quantity of sub-iterations of the successive non-linear distortion correction process. The UE may perform the respective subsets of the set of non-linear estimation processes during the quantity of sub-iterations of the successive non-linear distortion correction process in accordance with the schedule.

30 Claims, 17 Drawing Sheets

1600

SUCCESSIVE DIGITAL POST DISTORTION CORRECTION

FIELD OF TECHNOLOGY

The following relates to wireless communication, including successive digital post distortion (DPoD) correction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support successive digital post distortion (DPoD) correction. For example, the described techniques provide for a successive DPoD correction process estimating non-linear distortion for subsets of transmission lanes during sub-iterations. In some examples, a user equipment (UE) may transmit a capability message to a network entity indicating a capability of the UE to perform successive DPoD correction, and may transmit a control message to indicate a supported batch size corresponding to a quantity of parallel estimation processes the UE may perform. Based on the capability message and the batch size, the network entity may determine and transmit a schedule for performing one or more estimation (e.g., non-linear projection, estimation using previous results, scalar estimation) and correction processes to correct distortion associated with subsets of transmission lanes of the network entity. In accordance with the schedule, the UE may perform the one or more estimation and correction processes for the subsets during the sub-iterations to at least partially correct a non-linear distortion present in a received signal.

A method for wireless communication by a UE is described. The method may include transmitting a control message indicating a quantity of parallel processes supported at the UE, the quantity of parallel processes associated with each of a quantity of sub iterations of a successive non-linear distortion correction process, receiving, based on the control message, a scheduling configuration message indicating a schedule for performing respective subsets of a set of non-linear estimation processes during each sub-iteration of the quantity of sub-iterations of the successive non-linear distortion correction process, and performing, in accordance with the schedule, the respective subsets of the set of non-linear estimation processes during the quantity of sub-iterations of the successive non-linear distortion correction process.

A UE for wireless communication is described. The UE may include one or more memories storing processor executable code, and one or more processors coupled with the one or more memories. The one or more processors may individually or collectively operable to execute the code to cause the UE to transmit a control message indicating a quantity of parallel processes supported at the UE, the quantity of parallel processes associated with each of a quantity of sub iterations of a successive non-linear distortion correction process, receive, based on the control message, a scheduling configuration message indicating a schedule for performing respective subsets of a set of non-linear estimation processes during each sub-iteration of the quantity of sub-iterations of the successive non-linear distortion correction process, and perform, in accordance with the schedule, the respective subsets of the set of non-linear estimation processes during the quantity of sub-iterations of the successive non-linear distortion correction process.

Another UE for wireless communication is described. The UE may include means for transmitting a control message indicating a quantity of parallel processes supported at the UE, the quantity of parallel processes associated with each of a quantity of sub iterations of a successive non-linear distortion correction process, means for receiving, based on the control message, a scheduling configuration message indicating a schedule for performing respective subsets of a set of non-linear estimation processes during each sub-iteration of the quantity of sub-iterations of the successive non-linear distortion correction process, and means for performing, in accordance with the schedule, the respective subsets of the set of non-linear estimation processes during the quantity of sub-iterations of the successive non-linear distortion correction process.

A non-transitory computer-readable medium storing code for wireless communication is described. The code may include instructions executable by one or more processors to transmit a control message indicating a quantity of parallel processes supported at the UE, the quantity of parallel processes associated with each of a quantity of sub iterations of a successive non-linear distortion correction process, receive, based on the control message, a scheduling configuration message indicating a schedule for performing respective subsets of a set of non-linear estimation processes during each sub-iteration of the quantity of sub-iterations of the successive non-linear distortion correction process, and perform, in accordance with the schedule, the respective subsets of the set of non-linear estimation processes during the quantity of sub-iterations of the successive non-linear distortion correction process.

Some examples of the method, UEs, and non-transitory computer-readable medium described herein may further include operations, features, means, or instructions for transmitting a capability message indicating a capability of the UE associated with performing the successive non-linear distortion correction process, where the quantity of parallel processes supported at the UE may be based on the capability of the UE.

Some examples of the method, UEs, and non-transitory computer-readable medium described herein may further include operations, features, means, or instructions for receiving a first signal including one or more first symbols, where performing the respective subsets of the set of non-linear estimation processes may be based on estimating one or more second symbols of a second signal transmitted by a network entity and corresponding to the one or more first symbols of the first signal.

In some examples of the method, UEs, and non-transitory computer-readable medium described herein, at least partially correcting, during each sub-iteration of the quantity of sub-iterations of the successive non-linear distortion correction process, an amplitude and phase of a first symbol of the one or more first symbols based on performing a respective subset of the set of non-linear estimation processes.

Some examples of the method, UEs, and non-transitory computer-readable medium described herein may further include operations, features, means, or instructions for performing respective subsets of a second set of non-linear estimation processes during the quantity of sub-iterations, where each non-linear estimation process of a first subset of the second set of non-linear estimation processes may be based on a respective non-linear estimation process of a second subset of the set of non-linear estimation processes, where the first subset may be performed during a first sub-iteration of the quantity of sub-iterations and the second subset may be performed during a second sub-iteration before the first sub-iteration.

Some examples of the method, UEs, and non-transitory computer-readable medium described herein may further include operations, features, means, or instructions for performing respective subsets of a third set of linear estimation processes during the quantity of sub-iterations of the successive non-linear distortion correction process, where each linear estimation process of the third set of linear estimation processes may be associated with estimating a respective scalar coefficient value.

In some examples of the method, UEs, and non-transitory computer-readable medium described herein, the quantity of parallel processes supported at the UE may be based on a threshold latency value, a threshold power value, a threshold complexity value, or any combination thereof.

In some examples of the method, UEs, and non-transitory computer-readable medium described herein, the schedule may be based on one or more parameters associated with one or more transmission lanes of a network entity.

In some examples of the method, UEs, and non-transitory computer-readable medium described herein, the schedule may be based on the quantity of parallel processes supported at the UE.

In some examples of the method, UEs, and non-transitory computer-readable medium described herein, the set of non-linear estimation processes includes one or more non-linear kernel projection processes, one or more Fourier transform processes, and one or more inverse Fourier transform processes.

A method for wireless communication by a network entity is described. The method may include obtaining a control message indicating a quantity of parallel processes supported at a UE, the quantity of parallel processes associated with each of a quantity of sub iterations of a successive non-linear distortion correction process and outputting, based on the control message, a scheduling configuration message indicating a schedule for performing respective subsets of a set of non-linear estimation processes during each sub-iteration of the quantity of sub-iterations of the successive non-linear distortion correction process.

A network entity for wireless communication is described. The network entity may include one or more memories storing processor executable code, and one or more processors coupled with the one or more memories. The one or more processors may individually or collectively operable to execute the code to cause the network entity to obtain a control message indicating a quantity of parallel processes supported at a UE, the quantity of parallel processes associated with each of a quantity of sub iterations of a successive non-linear distortion correction process and output, based on the control message, a scheduling configuration message indicating a schedule for performing respective subsets of a set of non-linear estimation processes during each sub-iteration of the quantity of sub-iterations of the successive non-linear distortion correction process.

Another network entity for wireless communication is described. The network entity may include means for obtaining a control message indicating a quantity of parallel processes supported at a UE, the quantity of parallel processes associated with each of a quantity of sub iterations of a successive non-linear distortion correction process and means for outputting, based on the control message, a scheduling configuration message indicating a schedule for performing respective subsets of a set of non-linear estimation processes during each sub-iteration of the quantity of sub-iterations of the successive non-linear distortion correction process.

A non-transitory computer-readable medium storing code for wireless communication is described. The code may include instructions executable by one or more processors to obtain a control message indicating a quantity of parallel processes supported at a UE, the quantity of parallel processes associated with each of a quantity of sub iterations of a successive non-linear distortion correction process and output, based on the control message, a scheduling configuration message indicating a schedule for performing respective subsets of a set of non-linear estimation processes during each sub-iteration of the quantity of sub-iterations of the successive non-linear distortion correction process.

Some examples of the method, network entities, and non-transitory computer-readable medium described herein may further include operations, features, means, or instructions for obtaining a capability message indicating a capability of the UE associated with performing the successive non-linear distortion correction process, where the quantity of parallel processes supported at the UE may be based on the capability of the UE.

Some examples of the method, network entities, and non-transitory computer-readable medium described herein may further include operations, features, means, or instructions for outputting a first signal including one or more symbols, the first signal associated with the quantity of parallel processes and the quantity of sub iterations of the successive non-linear distortion correction process.

In some examples of the method, network entities, and non-transitory computer-readable medium described herein, the schedule may be based on one or more parameters associated with one or more transmission lanes of the network entity.

In some examples of the method, network entities, and non-transitory computer-readable medium described herein, the schedule may be based on the quantity of parallel processes supported at the UE.

In some examples of the method, network entities, and non-transitory computer-readable medium described herein, the set of non-linear estimation processes includes one or more non-linear kernel projection processes, one or more Fourier transform processes, and one or more inverse Fourier transform processes.

DETAILED DESCRIPTION

Figure 1:
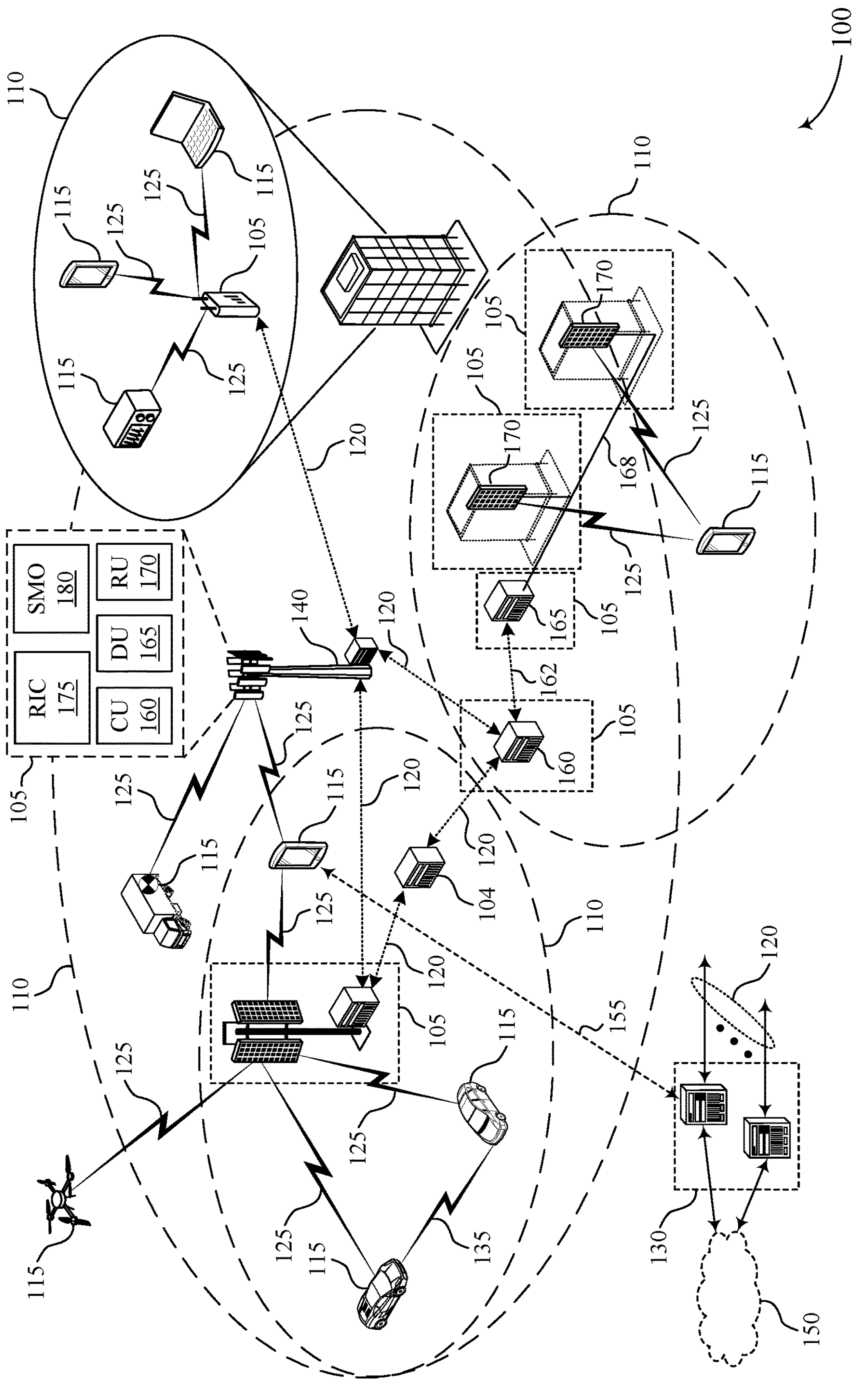
FIG. 1 shows an example of a wireless communications system that supports successive digital post distortion (DPoD) correction in accordance with one or more aspects of the present disclosure.

To reduce power consumption, a network entity may reduce a supply voltage to a power amplifier used in transmissions. Reducing a supply voltage to a power amplifier may increase non-linear distortion in transmissions which may result in an increase of errors or failed decoding, among additional impairments to communications. In some examples, a UE may mitigate non-linear distortion by performing digital post distortion (DPoD) correction. For example, a DPoD correction process may include using a received signal to estimate non-linear distortion introduced in a corresponding originally transmitted signal and removing the estimated non-linear distortion from the received signal. For example, the UE may perform a DPoD correction process for each symbol of a signal by performing multiple non-linear projection processes in parallel to estimate the effect of transmission lanes at the network entity. The UE may also perform multiple iterations of projection and correction processes to further improve a signal quality. However, non-linear projection in DPoD may involve a high complexity cost, which may increase power consumption at the UE for each DPoD process performed in parallel. For systems involving large quantities of transmission lanes at a network entity, and hence large quantities of parallel DPoD non-linear projection procedures, such complexity may significantly reduce performance and increase latency in a network, while increasing a power consumption at one or more devices.

As described herein, a wireless communications system may support a successive DPoD correction process to reduce complexity, decrease latency, and improve performance. For example, a UE may determine a batch size for performing parallel non-linear estimation processes in DPoD correction and may indicate this batch size to the network entity. Based on the batch size, the network entity may schedule non-linear estimation (e.g., projection) and correction processes at the UE, corresponding to subsets of transmission lanes (e.g., antenna ports) at the network entity, for performing during successive sub-iterations of a larger iteration of the DPoD correction process. In accordance with the schedule, the UE may use a received signal (e.g., a precoded reference signal with precoded information) to perform non-linear distortion estimation for a respective subset of the transmission lanes in each sub-iteration. By performing a smaller amount of complex calculations at a time within smaller sub-iterations, the UE may utilize results at an earlier time during an iterative DPoD correction process, enabling the UE to increase a speed at which the UE improves a signal quality to meet a target metric. Successive DPoD correction may also improve a performance at an end of a time period compared to DPoD using larger iterations. Additionally, the UE may increase a speed and gain of non-linear correction further by performing simpler estimations for subsets of transmission lanes not scheduled for non-linear projection during a sub-iteration. For example, simpler estimations may be based on a previous non-linear projection or a scalar coefficient.

Aspects of the disclosure are initially described in the context of wireless communications systems. Aspects of the disclosure are further illustrated by and described with reference to DPoD correction schemes, process flows, and correction schedules. Aspects of the disclosure are further illustrated by and described with reference to apparatus diagrams, system diagrams, and flowcharts that relate to successive DPoD correction.

FIG. 1 shows an example of a wireless communications system 100 that supports successive DPoD correction in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support successive DPoD correction as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_S=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, the wireless communications system 100 may support a successive DPoD correction process to reduce complexity, decrease latency, and improve performance in communications between devices. For example, a UE 115 may determine a batch size for subsets of a larger quantity of transmission lanes of a network entity 105 used to transmit a signal, and may indicate this batch size. Based on the batch size, the network entity 105 may schedule complex non-linear correction at the UE 115 for each of the subsets during successive sub-iterations of a larger iteration related to the transmission lanes. The UE may further perform simpler estimations for remaining transmission lane processes that are not part of a selected subset during a given sub-iteration. For example, simpler estimations may be based on a previous non-linear estimation, or may include one or more scalar estimations.

Figure 2:
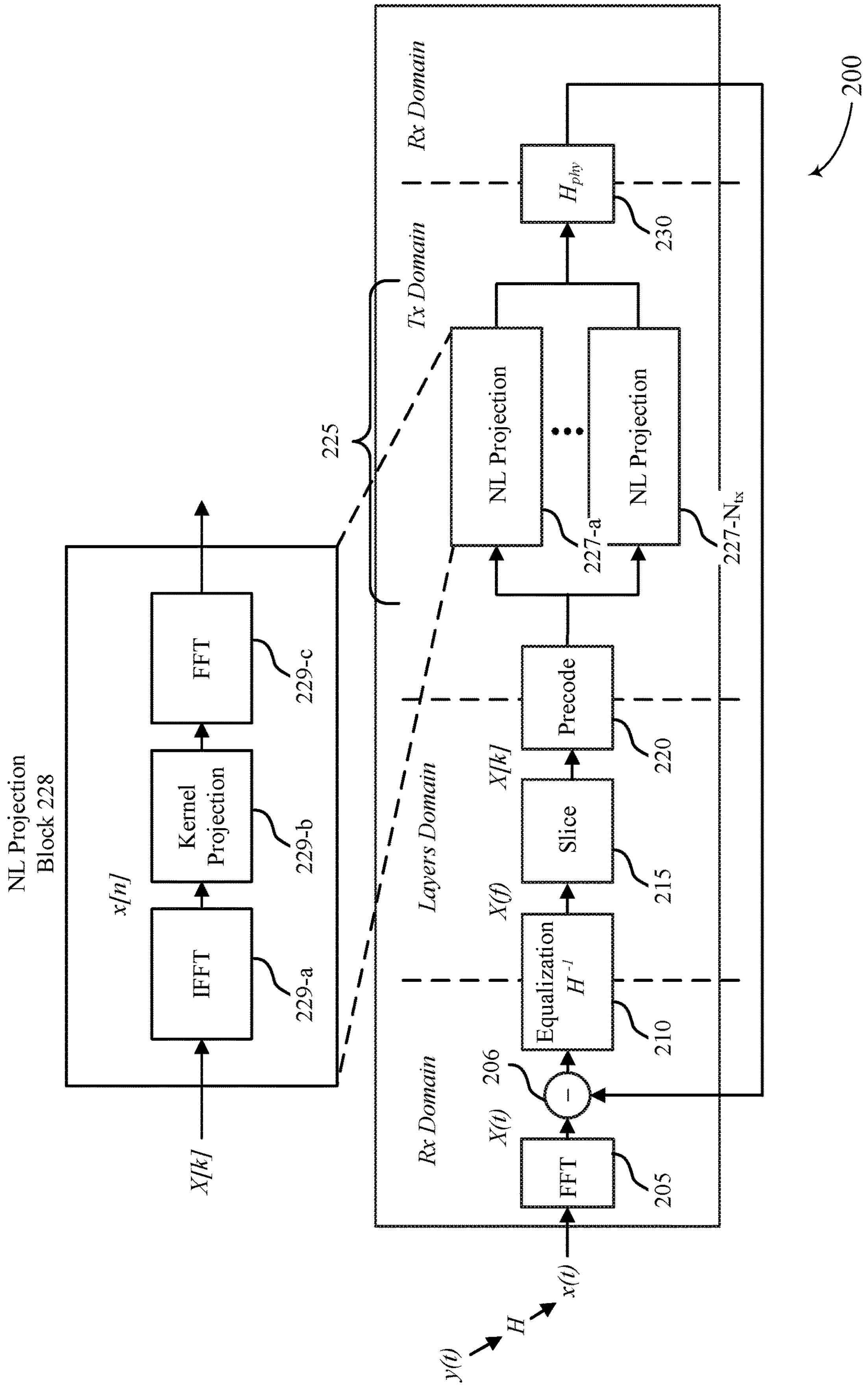
FIG. 2 shows an example of a DPoD correction scheme that supports successive DPoD correction in accordance with one or more aspects of the present disclosure.

FIG. 2 shows an example of a DPoD correction scheme 200 that supports successive DPoD correction in accordance with one or more aspects of the present disclosure. The DPoD correction scheme 200 may implement or be implemented to realize aspects of the wireless communications system 100. For example, the DPoD correction scheme 200 may illustrate one or more processes performed at a UE 115 as part of an iterative DPoD correction process to correct non-linear distortion in a signal received from a network entity 105. In some examples, the DPoD correction scheme 200 may support a successive DPoD correction process to reduce complexity, decrease latency, and improve performance in non-linear distortion correction at a UE 115.

For example, DPoD may be used at a UE 115 to correct non-linear distortion in a received signal output by a network entity 105. Notably, a power amplifier may be an example of a relatively power hungry component of a network entity, and so designing a power amplifier to be operable even with relatively low or reduced power consumption may be prioritized for some network entities, UEs, or other devices. For example, a supply voltage to a power amplifier may be lowered to reduce power consumption in systems where power savings may be prioritized (e.g., Green Networks). However, as power consumption decreases, it may result in a smaller or less robust linearity region for the power amplifier, and may consequently add non-linear distortion to one or more signal transmissions. For example, reducing a supply voltage of a power amplifier of a network entity 105 may increase a non-linear relationship between the input and output of the power amplifier, subsequently introducing non-linear distortion into an amplitude or a phase of signals transmitted by the network entity 105. In some examples, such distortion may be represented by an added amplitude-amplitude (AM) distortion or an added amplitude-phase (PM) distortion applied to a transfer function of the power amplifier, which may add non-linearity distortion corrupting error to transmitted signals.

In some cases, UEs 115 or other devices may mitigate non-linear distortion by performing DPoD correction to a received signal (e.g., a downlink signal from a network entity 105). A DPoD correction process may involve estimating a power amplifier coefficients model that may represent a non-linearity introduced by the power amplifier to a transmitted signal. This estimation may be done iteratively along with channel estimation using broadcasted pilot signals (e.g., reference signals). For example, in addition to performing channel estimation in DPoD using a demodulation reference signal (DMRS), a UE 115 may also perform estimation of a related power amplifier non-linear model and its effect on the same DMRS signal. The DPoD process may also include a data (e.g., from a physical downlink shared channel (PDSCH) message) processing stage at which the non-linear distortion within the data is corrected (e.g., removed, suppressed) by subtracting the estimated distortion iteratively from the original signal. This distortion may be reconstructed by applying the estimated power amplifier model on the hard decisions on the received equalized data to estimate an original signal and corresponding effect from the power amplifier. DPoD Processes may also utilize a same codebook precoder, which may be updated each time a CSI-RS is received, as part of the reconstruction chain in order to reconstruct the distortion in the transmission domain, where it is originally generated. In some cases, these steps for signal estimation and distortion correction may be illustrated by steps 205 through 230 of the DPoD correction scheme 200.

For example, a UE 115 may receive a signal x(t) using one or more antennas (e.g., in the receive, Rx, domain), where x(t) may represent an original signal y(t) output by the network entity 105 including distortion from a corresponding channel H. The UE 115 may convert the signal x(t) to the frequency domain using a Fast Fourier Transform (FFT) (or other Fourier transform) to produce X(f) and may perform equalization at 210 represented by $H^{-1}(X(f))$ to remove the effects of the channel H in which the signal x(t) was received. In a "layers" domain, the UE 115 may "slice" the signal (e.g., using a slicer or demodulation device) at 215, or in other words, may perform hard decisions using the signal to determine a sequence of bits corresponding to modulated symbols of the received signal x(t). The result of the slicing may output a discrete signal X[k]. In some cases, slicing may be performed according to a corresponding modulation scheme with which the signal y(t) was originally transmitted. The output X[k] may thus represent the original message as demodulated by the UE 115 in the frequency domain, which may still include errors due to non-linear distortion from the network entity 115 power amplifier. For example, some discrete values of X[k] may be different (e.g., correspond to different bits) than the signal that was originally intended (e.g., before amplification and transmission of y(t)) due to the non-linear error in X(f).

The UE 115 may estimate the originally transmitted signal y(t) by treating the signal X[k] as an input and representing an originally modulated signal before amplification and transmission by the network entity 105. For example, at 220, the UE 115 may perform a precoding operation on X[k] using a same precoder as used by the network entity 105 (e.g., to generate y(t)). At 225, the UE 115 may further perform one or more estimation processes 227 on the precoded signal to simulate the same transmitted signal (e.g., in a transmission, Tx, domain) and to estimate the effect of the power amplifier on the signal X[k] during transmission. For example, the UE 115 may utilize one or more processes to perform non-linear projection of a corresponding portion of X[k](e.g., a symbol of a modulated transmission) using estimation processes 227-*a* through 227-$N_{tx}$. Notably, the quantity $N_{tx}$ may correspond to a same quantity of transmission lanes (e.g., including respective circuitry and antennas) used by the network entity 105 to transmit the signal y(t). Thus, the UE 115 may estimate the specific non-linear distortion introduced by the power amplifier for each transmission lane of the network entity 105.

In some examples, a non-linear projection of X[k] may be illustrated by the non-linear projection block 228, which may otherwise be referred to as a kernel projection block. For example, at 229-*a*, X[k] may be converted to the time domain using an inverse FFT (IFFT) to produce x[n]. At 229-*b*, a kernel projection may be performed on x[n] to estimate the corresponding non-linear distortion for each transmission lane, which may include a power amplifier coefficients $c_n$ component. This projection may be done for each transmission lane, where the result as generated by kernel projection may be represented by Equation 1 below.

$$\sum_{n=1}^{N_{tx}} c_n x[n]|x[n]|^{2n} \quad (1)$$

Notably, as the sum is from n=1 to $N_{tx}$, the result may output an estimate of the distortion included in the original signal y(t) with the original signal removed, so the distortion is all that remains (e.g., y(t) would correspond to n=0). At 229-*c* the estimated distortion may be converted back into the frequency domain using an FFT.

Once the estimation of the non-linear distortion is complete, the result may be output to 230, where $H_{phy}$ may be applied to output the full estimated distortion after transmission through the channel H, and the estimation may be complete. The UE 115 may then subtract the estimated distortion from the received signal x(t) at 206, which may at least partially correct the signal x[t] based on the estimation. The UE 115 may iterate the DPoD scheme 200 over multiple iterations using the output of each previous iteration as the input to a next iteration to iteratively remove an effect of distortion on the signal x(t). Once the correct signal satisfies (e.g., is equal to, is greater than, is less than, depending on threshold) a targeted threshold (e.g., receive power or quality), the signal may be passed onto a decoding stage after a final equalization procedure and slicing procedure are done to determine the final demodulated signal.

For $N_{tx}$ transmission lanes at the network entity 105, the UE 115 may perform $N_{tx}$ non-linear projection procedures in parallel. As each kernel projection block may include IFFT, kernel projection, and FFT for each lane estimation, each single projection process may have a complexity of $O(N_{FFT} \cdot \log_2 N_{FFT})$. For a value of $N_{tx}$ transmission lanes (e.g., $N_{tx}$ antennas) and $N_{tx}$ corresponding projection blocks, the complexity becomes $O(N_{tx} \cdot N_{FFT} \cdot \log_2 N_{FFT})$, and for a total of Niter iterations, a total complexity of the DPoD correction phase for the signal x(t) may be $O(N_{FFT} \cdot N_t \cdot N_{FFT} \cdot \log_2 N_{FFT})$. Notably, as a quantity of transmission lanes and antennas of a network entity 105 increases (e.g., during massive MIMO), a DPoD algorithm at the UE 115 may incur penalty in both an increased implementation complexity (due to increase in FFT and IFFT operations), which may result in increased UE power consumption and latency in communications. Further, for $N_{tx}$ non-linear projections, the receiver of the UE 115 would use $N_{tx}$ IFFT/FFT blocks in parallel, which for higher $N_{tx}$ values may be limited by a quantity of available IFFT/FFT blocks of the UE 115.

As described herein, one or more devices operable to perform DPoD using the DPoD scheme 200 may additionally or alternatively support a successive DPoD correction process to reduce complexity, decrease latency, and improve performance in communications between devices. For example, a UE 115 may perform complex non-linear projection for a subset of transmission lanes of a network entity 105 using a subset of the estimation processes 227 during multiple sub-iterations to reduce a complexity of calculations at each iteration and utilize results at sooner time periods to decrease latency and increase gain in correction procedures. Additionally, the UE 115 may perform one or more simpler calculations for remaining estimation processes 227 during each sub-iteration to further increase gain and reduce latency.

Figure 3:
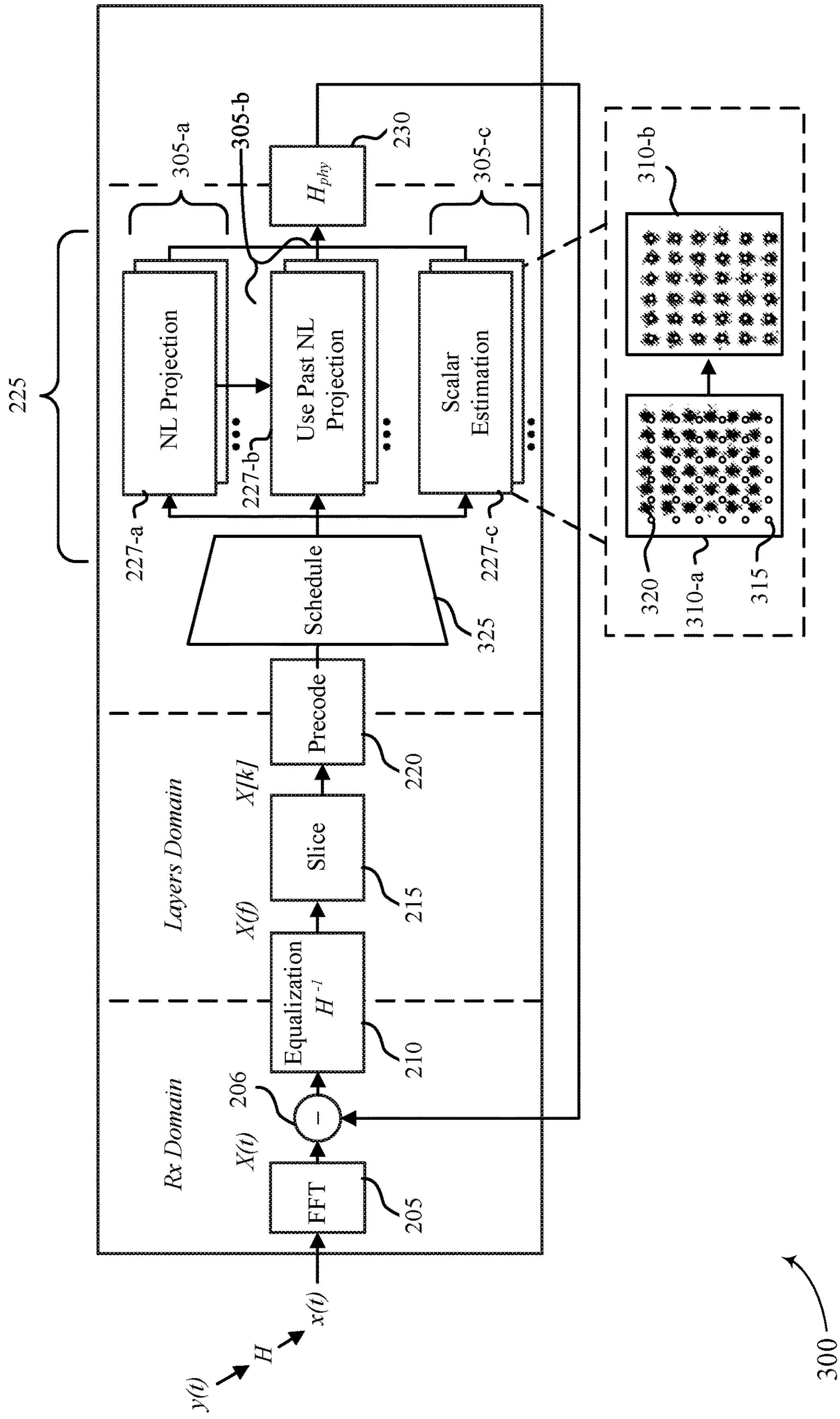
FIG. 3 shows an example of a DPoD correction scheme that supports successive DPoD correction in accordance with one or more aspects of the present disclosure.

FIG. 3 shows an example of a DPoD correction scheme 300 that supports successive DPoD correction in accordance with one or more aspects of the present disclosure. The DPoD correction scheme 200 may implement or be implemented to realize aspects of the wireless communications system 100 and the DPoD correction scheme 200. For example, the DPoD correction scheme 300 may illustrate the DPoD scheme 200 including further techniques for performing subsets of a total quantity of non-linear estimation processes during sub-iterations for both complexity reduction and performance and latency improvement as described herein. For example, instead of performing $N_{tx}$ projection operations in parallel during one or more iterations, a UE 115 may instead use smaller sub-iterations to correct a non-linear distortion in x(t) for a subset of transmission lanes at a time.

During a first sub-iteration of a DPoD process, a subset 305-*a* of the estimation processes 227, corresponding to a subset of the $N_{tx}$ lanes of the network entity 105, may involve full non-linear projections. For example, a estimation process 227-*a* may involve a non-linear projection for a distortion for a corresponding transmission lane. In some examples, the subset 305-*a* may correspond to a first subset of symbols of x(t). Further, multiple successive DPoD sub-iterations may correspond to a single larger iteration and may be used to perform a greater quantity of iterations for a full iterative correction process.

During the same sub-iteration, a UE 115 may estimate a remainder of the distortion for the $N_{tx}$ lanes using simpler calculations to reduce a complexity during the sub-iteration while still performing some correction. For example, a subset 305-*b* of the estimation processes 227 may involve estimation using a previous iteration result. In one example, an estimation process 227-*b* of the subset 305-*b* may be performed based on a previous full non-linear estimation performed for the same transmission lane in a previous sub-iteration. Additionally, or alternatively, one or more of the remaining estimation processes 227 may involve simple scalar calculations, including at least estimations based on a Bussgang coefficient B as described herein. For example, a scalar estimation process may be performed at an estimation process 227-*c* of a subset 305-*c*.

For example, a scalar coefficient B may be used to correct a scalar, or linear, component of non-linear distortion. For example, the Bussgang theorem shows that a cross correlation between two Gaussian signals is the same before and after one of the signals has passed through a non-linear function except for a scaling factor B. For example, if a signal x passes through a non-linear system $U(\cdot)$ (such as the power amplifier of the network entity 115), the output signal z may be defined as z=U(x). By the Bussgang theorem, the output signal z may be decomposed as represented by Equation 2 below:

$$z = U(x) = B \cdot x + \eta \quad (2)$$

In Equation 2, $\eta$ may be a zero-mean random variable that is uncorrelated to x, while a value of B may depend on a choice of the non-linear function $U(\cdot)$. The Bussgang theorem may also apply for third-order non-linearity and for MIMO systems. For non-Gaussian signals, Equation 2 may represent a generalized Bussgang decomposition for a non- Gaussian random vector x. For example, B·x may be a linear component and may represent a linear minimum mean square error (MMSE) estimate of the output signal z given a non-Gaussian distributed observation x. In contrast, η may be an estimation error that is uncorrelated with x, and may represent a non-linear component of the signal. In other words, by the Bussgang theorem, a distortion U(x) for an output signal z may be constructed from a linear component described by a coefficient B, and a non-linear component η which is uncorrelated with the input signal x.

A UE 115 may in some cases mitigate a power amplifier non-linearity at least partially by applying a scaling factor B on the received signal in the transmission domain estimation and subtracting this linear portion of the error from the received signal. The signal X(f) may be received in accordance with a modulation scheme (e.g., quadrature amplitude modulation (QAM)), which may be represented by a plot 310-*a* as a constellation of received symbols. For example, the originally intended modulation scheme used to modulate a message transmitted in y(t) may be represented by one or more points 315 in a grid pattern which may also be the expected locations of the received points for slicing. One or more “clouds” 320 of points may represent the actual points at which symbols of x(t), and thus X(f), are received. Notably, the received signal may include non-linear distortion as represented by the difference between the locations and sizes of the clouds 320 compared to the singular expected points 315.

Using the Bussgang theorem, the UE 115 may break down the distortion to the clouds 320 of points of the received signal into a non-linear component and a linear component. The linear component (e.g., a dominant component) may be represented by a scaling transformation of the clouds 320 compared to the points 315, while a non-linear scattering of each of the clouds 320 may represent an effect of a non-linear transformation. This scaling may be defined by a scaling factor B, which may be calculated at the UE 115 for the received signal, for example, at the layers domain, according to Equation 3 below:

$$B = \text{argmin}_b(|y' - b \cdot x|^2) \tag{3}$$

In Equation 3, y' and x may represent the received and original signal, respectively, and B may be a scalar value. By calculating B for the signals, the linear (e.g., scalar) component of the distortion may be approximated and subsequently removed from the received signal to generate the plot 310-*b*. Notably, the plot 310-*b* may illustrate the constellation of the received symbols after removing this scaling factor. As demonstrated in the two plots, correcting a linear portion of the signal presents a simple algorithm with low complexity that allows a significant improvement in error vector magnitude (EVM).

In some examples, a scheduling of the subsets may be determined by a network entity 105 and indicated to the UE 115, where such schedule may be implemented at 325. For example, at 325, the UE 115 may implement a schedule (e.g., using a “scheduler” or scheduling component) that defines an order in which different subsets (e.g., batches) of estimation processes may be performed. A schedule may in one example indicate to perform non-linear projection for the subset 305-*a* in a first sub-iteration, and to perform non-linear projection for another subset, for example, the subset 305-*b* or the subset 305-*c*, at a second iteration. In some cases, the network entity 105 may schedule subsets according to different parameters of corresponding transmission lane antennas, and may schedule to achieve a target metric achieved by a different order of corrections (e.g., faster convergence to correction, higher performance).

Scheduling a subset of transmission lane correction for each sub-iteration while performing simpler calculations in tandem may improve a quality of transmissions. For example, by using smaller sub-iterations, a next subset calculation may begin at an advanced starting point (e.g., with a better SER on slicer output due to using a previous sub-iteration instead of a previous iteration), which may speed up an overall operation and achieve a higher performance quicker. Further, performing projections for a small subset each iteration may reduce a complexity of calculations, while performing simple calculations at the same time may retain efficiency and further contribute to corrections. Additionally, scheduling each estimation process may further enhance a speed and performance in DPoD.

A complexity of a successive DPoD correction process may depend on a total quantity of sub-iterations $N_{sub\ Iter}$ and a batch size $N_{batch}$, with a total complexity of $O(N_{sub\ Iter} \cdot N_{batch} \cdot N_{FFT} \cdot \log_2 N_{FFT})$. Thus, an improvement factor (IF) in comparison to performing non-linear projection for all lanes simultaneously during a larger iteration may be represented by equation 4 below:

$$IF = \frac{N_{Iter} \cdot N_{tx} \cdot N_{FFT} \cdot \log_2 N_{FFT}}{N_{sub\ Iter} \cdot N_{batch} \cdot N_{FFT} \cdot \log_2 N_{FFT}} = \frac{N_{Iter} \cdot N_{tx}}{N_{sub\ Iter} \cdot N_{batch}} \tag{4}$$

Figure 4:
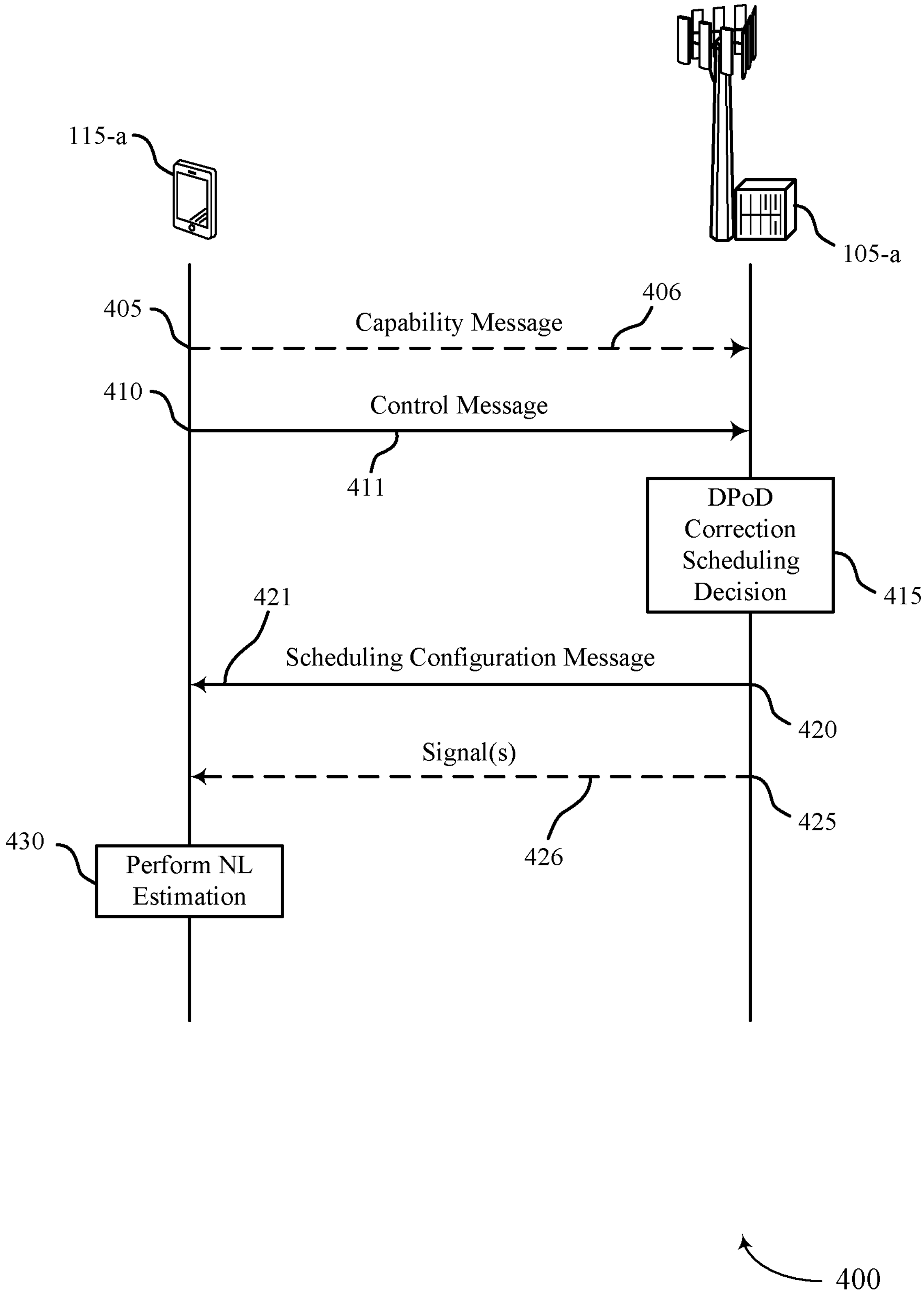
FIG. 4 shows an example of a process flow that supports successive DPoD correction in accordance with one or more aspects of the present disclosure.

FIG. 4 shows an example of a process flow 400 that supports successive DPoD correction in accordance with one or more aspects of the present disclosure. The process flow 400 may implement or be implemented to realize aspects of the wireless communications system 100, the DPoD correction scheme 200, and the DPoD correction scheme 300. For example, the process flow 400 may be implemented by a UE 115-*a* and a network entity 105-*a*, which may be examples of the corresponding devices described herein, including with reference to FIGS. 1-3. In some examples, the process flow 400 may support successive DPoD correction operations using smaller subsets for complex non-linear estimation during smaller iterations to modify a correction flow of a DPoD process for lower complexity by reducing operations in the transmission domain.

In the following description of the process flow 400, the operations may be performed (such as reported or provided) in a different order than the order shown, or the operations performed by the example devices may be performed in different orders or at different times. Some operations also may be omitted from the process flow 400, or other operations may be added to the process flow 400. Further, although some operations or signaling may be shown to occur at different times for discussion purposes, these operations may actually occur at the same time or at least partially concurrently.

At 405, the UE 115-*a* may optionally transmit, and the network entity 105-*a* may optionally obtain (e.g., receive, obtain via one or more wireless, physical, or other mediums, obtain via one or more other devices or components), a capability message 406 indicating a capability of the UE 115 to perform a successive non-linear distortion correction process. For example, the UE 115-*a* may indicate a capability to perform successive DPoD in the capability message 406, which the UE 115-*a* may transmit in uplink signaling to the network entity 105-*a* (e.g., via physical uplink control channel (PUCCH) messaging).

At 410, the UE 115-*a* may transmit, and the network entity 105-*a* may obtain, a control message 411 indicating a quantity of parallel processes supported at the UE 115-*a* that may be associated with each of a quantity of sub-iterations of the successive non-linear distortion correction process. For example, the UE 115-*a* may indicate a batch size in the control message 411 for sub-iterations of a successive DPoD correction process. In some examples, the quantity of parallel processes, or batch size, may correspond to a quantity of transmission lanes that may be corrected in a single sub-iteration using non-linear projection (e.g., high complexity, high accuracy correction).

In some cases, the quantity of parallel processes may indicate available transmission lanes (e.g., a quantity the UE 115-*a* may allocate for DPoD correction that will not be in use for other operations or transmissions at the time of an estimation procedure). The quantity of parallel processes may also be based on the capability of the UE. For example, the quantity of parallel processes may correspond to a maximum quantity of processes the UE 115-*a* may perform in parallel based on hardware constraints at the UE 115-*a* (e.g., based on a quantity of transmission lanes and antennas that may define a total quantity of available IFFT/FFT blocks that may be performed simultaneously). The quantity of parallel processes may be further based on a threshold latency value, a threshold power value, a threshold complexity value, or any combination thereof. The control message 411 may in some cases indicate a latency, one or more devices (e.g., modems), one or more parameters for one or more receivers, among other information related to the UE 115-*a*. Further, the control message 411 and the capability message 406 may be transmitted separately (e.g., control message 411 in via physical uplink control channel (PUCCH) messaging and a capability message in a less frequent signal), or together in a same message.

At 415, the network entity 105-*a* may determine a schedule for performing respective subsets of a set of non-linear estimation processes during each of the sub-iterations based on the control message 411. For example, the network entity 105-*a* may decide on a priority order for scheduling of correction for each antenna of the network entity 105-*a* as descried herein. In some examples, known parameters at the network entity 105-*a* may define a quality of transmissions by each antenna for each transmission lane (e.g., a precoder may change a root mean square (RMS) level for a quantity of antennas that are associated with a lower amplitude and lower non-linearity). For example, some antennas of the network entity 105-*a* may have a greater impact on non-linear distortion in a message than other antennas. In some cases, an amount of non-linear distortion introduced in a signal by an antenna (and corresponding transmission lane) may be based on a power amplifier model per lane, a backoff per lane, a peak-to-average power ratio (PAPR) per lane, a transmission antenna EVM, among other parameters. The network entity 105 may schedule corresponding non-linear corrections based on such parameters.

The network entity 105-*a* may prioritize antennas to achieve one or more objective functions. For example, to achieve faster convergence to a full non-linear distortion and correction (e.g., exceeding a threshold corrected signal power or threshold quality metric), the network entity 105-*a* may determine a scheduling rule or correction order for sub-iteration correction. In an example, the network entity 105-*a* may select a quantity of antennas from a total quantity of antennas equal to an indicated batch size (e.g., Ntx=8, but batch size may be 2) for correction in a first sub-iteration based on related parameters to achieve faster convergence (e.g., lanes 1 and 6 may be associated with a largest amount of non-linear distortion). The network entity 105-*a* may also schedule additional lanes for non-linear projection in later sub-iterations that, for example, may have less of an impact on non-linear distortion (e.g., lanes 2 and 3 during sub-iteration 2, lanes 5 and 8 during sub-iteration 3, lanes 4 and 7 during sub-iteration 4). A maximum batch size of the UE 115-*a* may in some cases affect the scheduling algorithm (e.g., based on a constraint of the maximum batch size).

At 420, the network entity 105-*a* may output (e.g., transmit, output via one or more wireless, physical, or other mediums, output via one or more other devices or components), and the UE 115-*a* may receive, a scheduling configuration message 421 based on the control message 411. For example, the scheduling configuration message 421 may indicate a schedule for performing respective subsets of a set of non-linear estimation processes (e.g., non-linear projection processes) during each sub-iteration of the quantity of sub-iterations. The schedule may be based on one or more parameters associated with (e.g., may be used to estimate and effect of) one or more transmission lanes of the network entity 105-*a* (e.g., lane-specific parameters considered at 415). The schedule may also be based on the quantity of parallel processes supported at the UE (e.g., batch size). In some cases, the network entity 105-*a* may output the scheduling decisions in the scheduling configuration message 421 in downlink to the UE 115-*a* (e.g., via PDCCH).

At 425, the network entity 105-*a* may optionally output, and the UE 115-*a* may optionally obtain, one or more signals 426. For example, UE 115-*a* may receive a first signal (e.g., x(t)) including one or more symbols (e.g., according to a modulation scheme) that may correspond to a second signal (e.g., y(t)) originally transmitted by the network entity 105-*a* (including non-linear distortion but before transmission through a channel). For example, the first signal may be the resulting signal including effects of the channel H in which the second signal is transmitted. The first signal may be associated with the quantity of parallel processes and the quantity of sub-iterations of the successive non-linear distortion correction process. For example, the signal may represent one or more pilot symbols or data messages that may be used in a DPoD correction procedure.

At 430, the UE 115-*a* may perform, in accordance with the schedule, the respective subsets of the set of non-linear estimation processes during each sub-iteration of the quantity of sub-iterations of the successive non-linear distortion correction process. For example, the UE 115-*a* may perform a successive DPoD process as illustrated in FIG. 3, where performing respective subsets of the set of non-linear estimation processes may be based on estimating one or more second symbols of the second signal y(t) transmitted by the network entity 105-*a* and corresponding to the one or more symbols of the first signal x(t). Notably, instead of estimating each signal in parallel in the transmission domain, the UE 115-*a* may perform one of three processes for an associated symbol of x(t) in an order decided by the scheduling received at 420.

For example, the set of non-linear estimation processes may include one or more non-linear kernel projection processes, one or more Fourier transform processes (e.g., FFT), and one or more inverse Fourier transform processes (e.g., IFFT) for full non-linear projection (e.g., having high complexity $O(N \cdot \log_2 N)$) of different subsets of a total quantity of transmission lanes and symbols to perform during each sub-iteration. The UE 115-*a* may also perform respective subsets of a second set of non-linear estimation processes during the quantity of sub-iterations using a non-linear projection result from previous sub-iterations (e.g., no complexity). For example, each non-linear estimation process of a first subset of the second set of non-linear estimation processes may be based on a respective non-linear estimation process of a second subset of the set of non-linear estimation processes. In such an example, the first subset may be performed during a first sub-iteration of the quantity of sub-iterations and the second subset may be performed during a second sub-iteration before the first sub-iteration.

Additionally, or alternatively, the UE 115-*a* may perform respective subsets of a third set of linear estimation processes during the quantity of sub-iterations of the successive non-linear distortion correction process based on a scalar estimation. For example, each linear estimation process of the third set of linear estimation processes may be associated with estimating a respective scalar coefficient value (e.g., a scaling coefficient B component of non-linear distortion). The UE 115-*a* may perform scalar estimations in some cases if a non-linear projection has not been previously applied to a lane (e.g., for a first sub-iteration in which a lane is corrected).

In some cases, the UE 115-*a* may at least partially correct (during each sub-iteration) an amplitude and phase of a first symbol (among additional symbols of the indicated quantity of parallel processes corresponding to a batch size) of the one or more first symbols based on performing a respective subset of the set of non-linear estimation processes. For example, during non-linear projection processes, the UE 115-*a* may estimate A/A and A/P distortion for a subset of symbols (e.g., for the indicated batch size) of the first signal during each sub-iteration using a respective transmission lane, and may subtract the estimated distortion from the first signal. In some cases, correcting amplitude and phase of the original signal may enable the UE to more effectively decode the received first signal to determine a message corresponding to an originally intended third signal (e.g., signal corresponding to modulated information before amplification adds distortion).

In some cases, a batch size may be dynamic. For example, the UE 115 may dynamically send batch sizes updated based on one or more parameters, where the network entity 105-*a* may adjust a schedule and inform the UE accordingly, which may increase a gain and speed of a DPoD process. For example, batch size may change based on resource availability or FFTs and transmission lanes at UE that are available at a given time.

Figure 5:
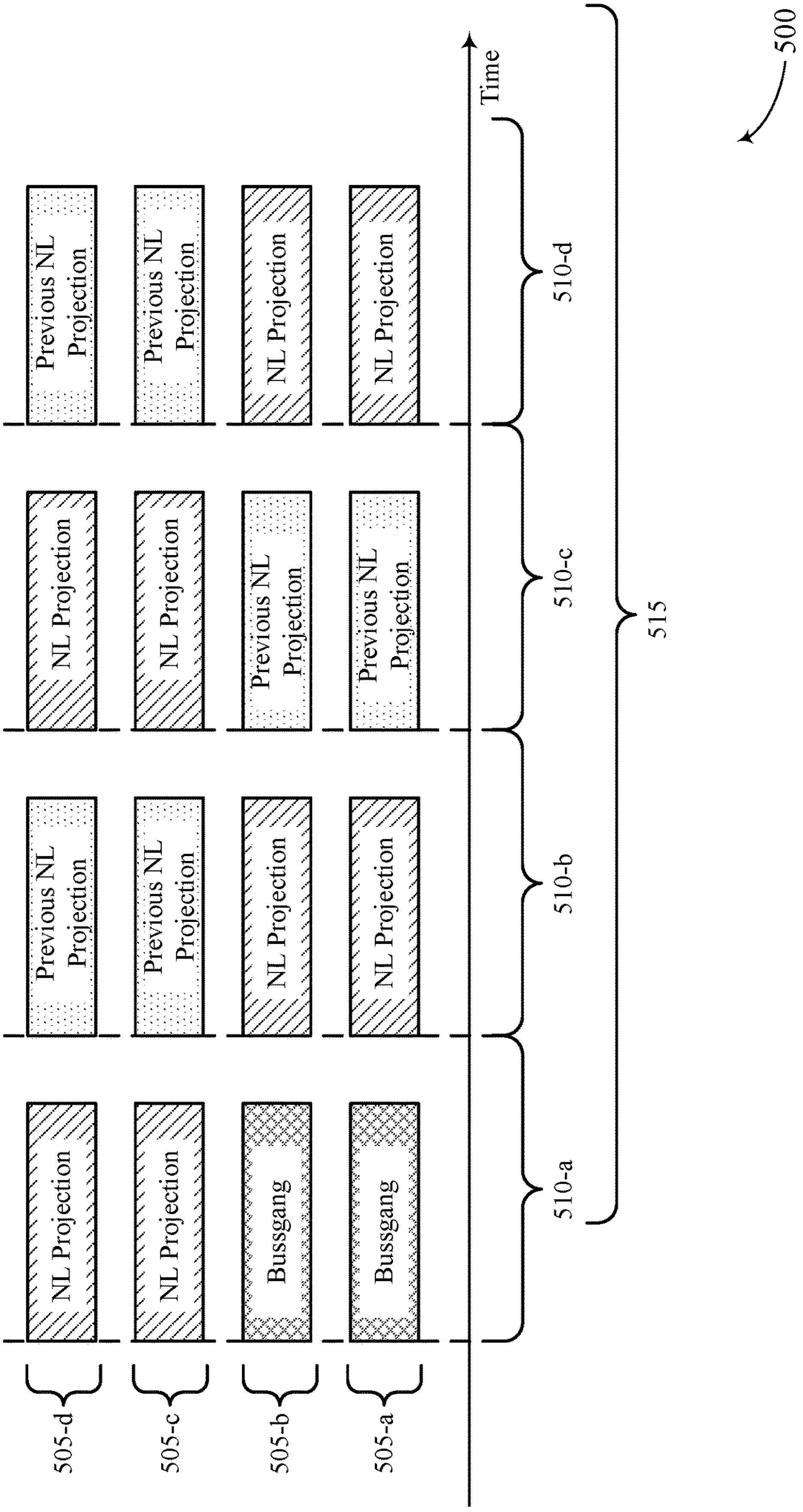
FIG. 5 shows an example of a correction schedule that supports successive DPoD correction in accordance with one or more aspects of the present disclosure.

FIG. 5 shows an example of a correction schedule 500 that supports successive DPoD correction in accordance with one or more aspects of the present disclosure. The correction schedule 500 may implement or be implemented to realize aspects of the wireless communications system 100, the DPoD correction scheme 200, the DPoD correction scheme 300, and the process flow 400. For example, correction schedule 500 may represent a schedule for performing different estimation procedures during each sub-iteration of a DPoD process at a UE 115. In some cases, the correction schedule 500 may represent the schedule indicated by the scheduling configuration message 421 to the UE 115-*a*.

For example, the correction schedule 500 may be a schedule for a total quantity of $N_{tx}=4$ transmission lanes 505 at the network entity 105-*a*, including transmission lanes 505-*a*, 505-*b*, 505-*c*, and 505-*d*. The UE 115-*a* may also indicate a batch size of 2 in the control message 411. During a successive DPoD process, the UE 115-*a* may correct the signal x(t) in a series of four sub-iterations 510, including sub-iterations 510-*a*, 510-*b*, 510-*c*, and 510-*d*. In some cases, the sub-iterations 510 may represent a quantity of sub-iterations for successfully correcting non-linear distortion above a threshold correction level (e.g., to reach a threshold receive power or signal quality).

Based on the scheduling performed at 415 of FIG. 4, the correction schedule 500 may be determined. For example, at the DPoD process, the UE 115-*a* may perform estimations during each sub-iteration according to the schedule 500. For example, in a first sub-iteration, the UE 115-*a* may perform non-linear projection for a batch size of transmission lanes according to the schedule, including the lanes 505-*c* and 505-*d*. In some cases, the lanes 505-*c* and 505-*d* may be scheduled for non-linear projection during the first sub-iteration 510-*a* based on different parameters (e.g., contributing to a greater non-linear contribution). During the same sub-iteration, the UE 115-*a* may perform Bussgang estimations using a scalar coefficient on the lanes 505-*a* and 505-*b* (e.g., lanes that have not yet had non-linear projection performed). The UE 115-*a* may subsequently correct a portion of non-linear distortion contributed by the lanes 505-*c* and 505-*d* while correcting a linear component of distortion to which the lanes 505-*a* and 505-*b* contributed.

During the second sub-iteration 510-*b*, the schedule may indicate for the UE 115-*a* to use a previous non-linear projection for further estimation of the lanes 505-*c* and 505-*d*, while the lanes 505-*a* and 505-*b* may at the sub-iteration 510-*b* include non-linear complex estimations. The lanes 505 may swap between non-linear projections and utilizing previous results for the sub-iterations 510-*c* and 510-*d*.

By projecting a small subset during each sub-iteration, a small subset of transmission lanes 505 may be used at a time for a full NL projection (e.g., high complexity cost for high accuracy) while a remainder of transmission lanes 505 may use previous (old) NL projection or use simple Bussgang scaling. In a next sub-iteration 510, the UE 115-*a* may use earlier results from a previous sub-iteration, as well as perform simpler calculations in tandem, and so may achieve a higher gain and improved signal by the end of sub-iteration 510-*d* compared to a traditional full non-linear correction process estimating all lanes during a singular iteration 515. That is, a higher gain may be reached by the end of 510-*d* using a same complexity. Further, as the UE 115-*a* is able to calculate results with higher granularity and improve an overall performance, the UE 115-*a* may reduce latency by reaching a target correction metric at a sooner period (e.g., within an iteration 515). Additionally, selecting antennas that contribute more to gain using a schedule may further contribute to performance and latency. In some examples, such improvements in gain and latency may result in reaching a target metric before the sub-iteration 510-*d*. In some cases, non-linear projection may not be performed on some lanes if a target metric is met in an earlier sub-iteration.

Figure 6:
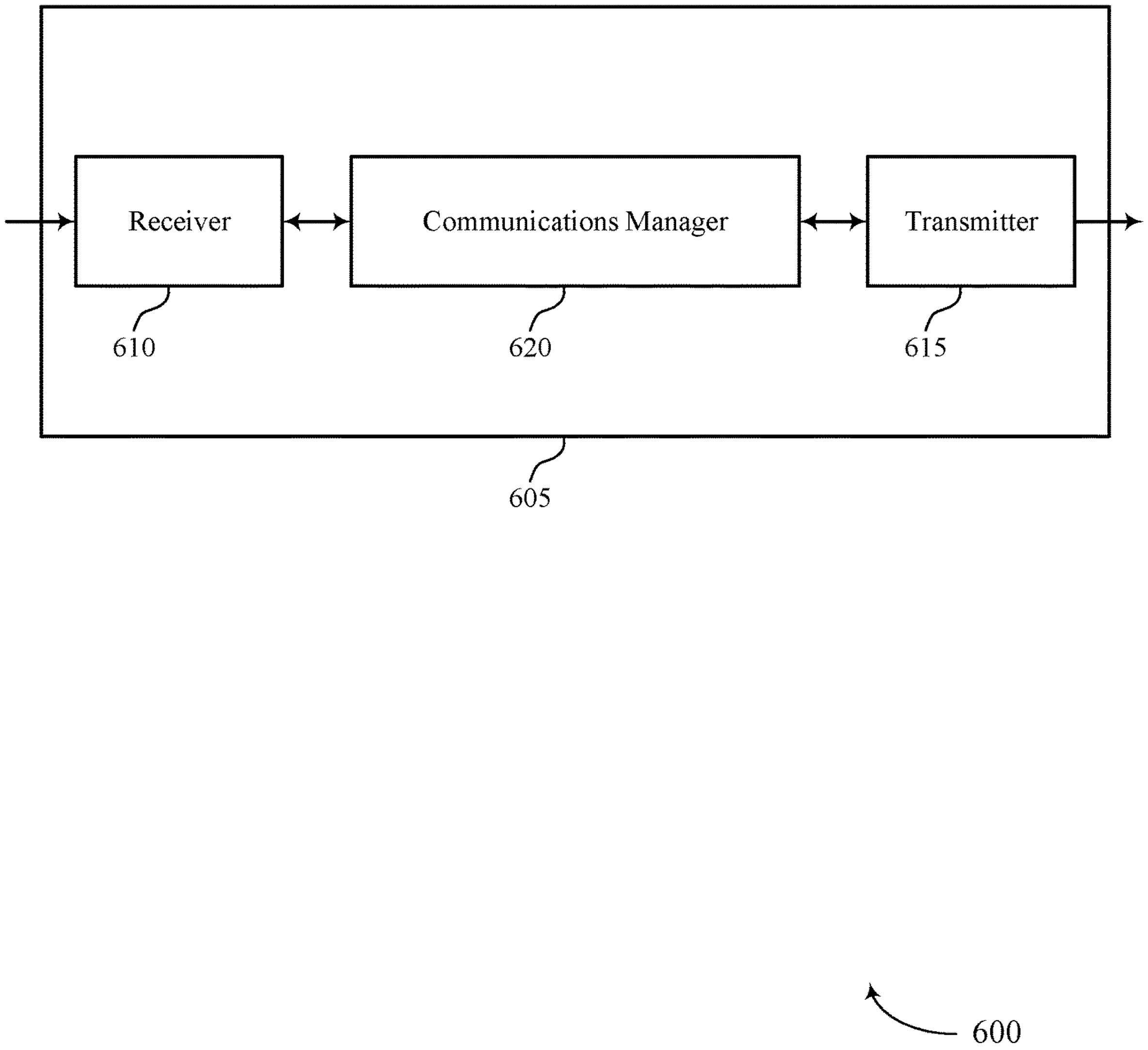
FIGS. 6 and 7 show block diagrams of devices that support successive DPoD correction in accordance with one or more aspects of the present disclosure.

FIG. 6 shows a block diagram 600 of a device 605 that supports successive DPoD correction in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to successive DPoD correction). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to successive DPoD correction). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of successive DPoD correction as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. For example, the communications manager 620 is capable of, configured to, or operable to support a means for transmitting a control message indicating a quantity of parallel processes supported at the UE, the quantity of parallel processes associated with each of a quantity of sub-iterations of a successive non-linear distortion correction process. The communications manager 620 is capable of, configured to, or operable to support a means for receiving, based on the control message, a scheduling configuration message indicating a schedule for performing respective subsets of a set of non-linear estimation processes during each sub-iteration of the quantity of sub-iterations of the successive non-linear distortion correction process. The communications manager 620 is capable of, configured to, or operable to support a means for performing, in accordance with the schedule, the respective subsets of the set of non-linear estimation processes during the quantity of sub-iterations of the successive non-linear distortion correction process.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced complexity in calculations, reduced power consumption, and more efficient utilization of communication resources by performing batches of non-linear correction processes during sub-iterations of a DPoD correction process.

Figure 7:
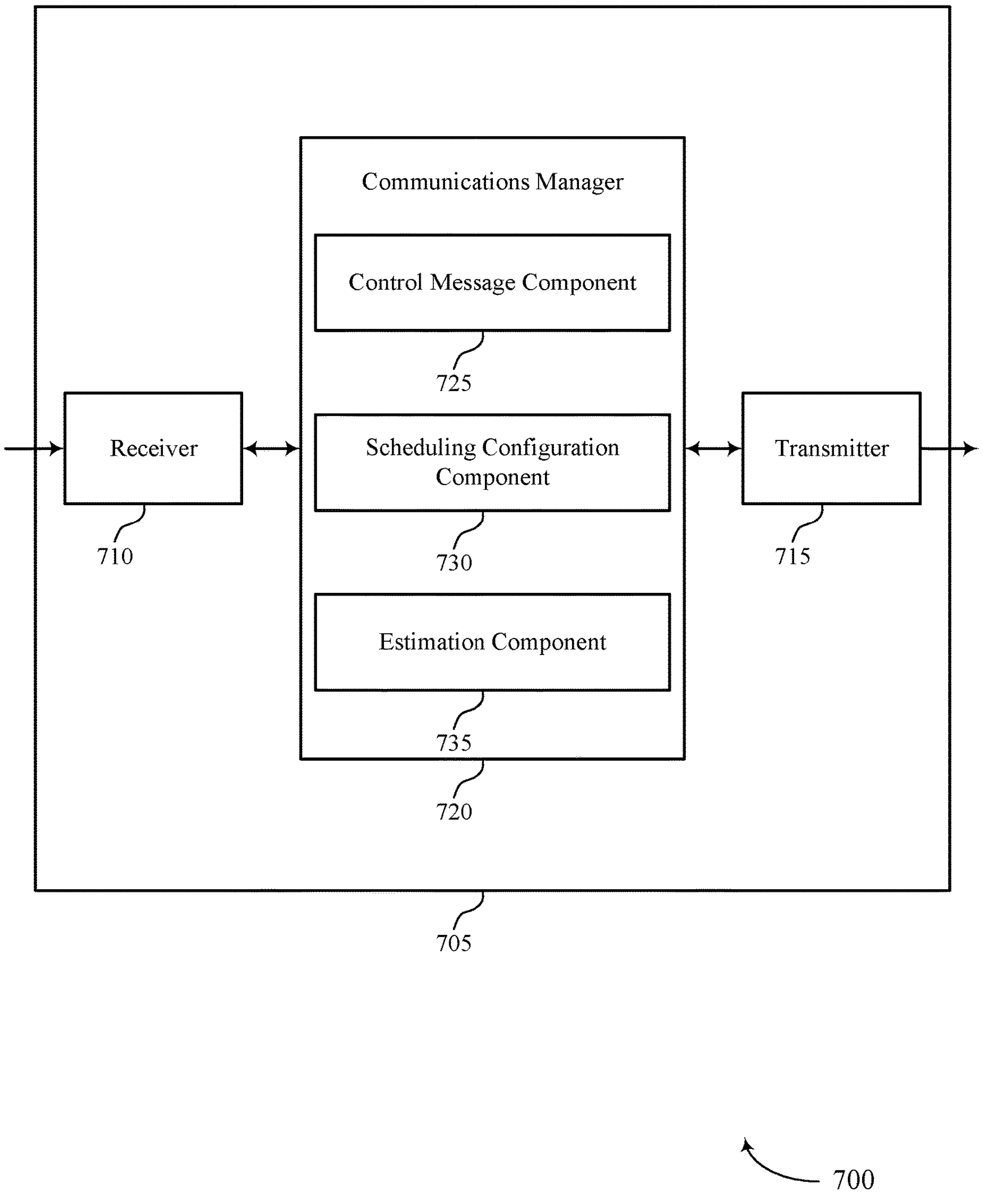

FIG. 7 shows a block diagram 700 of a device 705 that supports successive DPoD correction in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to successive DPoD correction). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to successive DPoD correction). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of successive DPoD correction as described herein. For example, the communications manager 720 may include a control message component 725, a scheduling configuration component 730, an estimation component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. The control message component 725 is capable of, configured to, or operable to support a means for transmitting a control message indicating a quantity of parallel processes supported at the UE, the quantity of parallel processes associated with each of a quantity of sub-iterations of a successive non-linear distortion correction process. The scheduling configuration component 730 is capable of, configured to, or operable to support a means for receiving, based on the control message, a scheduling configuration message indicating a schedule for performing respective subsets of a set of non-linear estimation processes during each sub-iteration of the quantity of sub-iterations of the successive non-linear distortion correction process. The estimation component 735 is capable of, configured to, or operable to support a means for performing, in accordance with the schedule, the respective subsets of the set of non-linear estimation processes during the quantity of sub-iterations of the successive non-linear distortion correction process.

Figure 8:
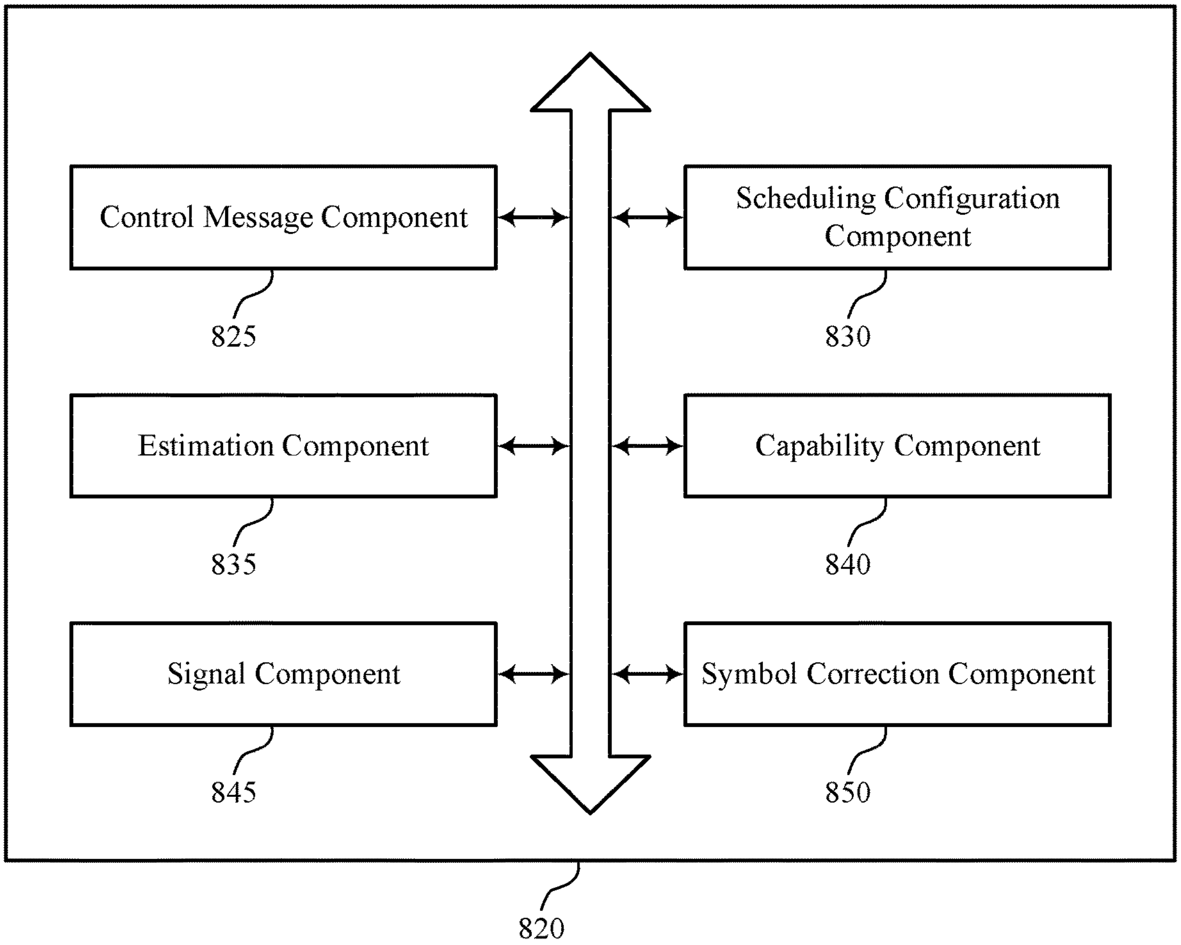
FIG. 8 shows a block diagram of a communications manager that supports successive DPoD correction in accordance with one or more aspects of the present disclosure.

FIG. 8 shows a block diagram 800 of a communications manager 820 that supports successive DPoD correction in accordance with one or more aspects of the present disclosure. The communications manager 820 may be an example of aspects of a communications manager 620, a communications manager 720, or both, as described herein. The communications manager 820, or various components thereof, may be an example of means for performing various aspects of successive DPoD correction as described herein. For example, the communications manager 820 may include a control message component 825, a scheduling configuration component 830, an estimation component 835, a capability component 840, a signal component 845, a symbol correction component 850, or any combination thereof. Each of these components, or components or subcomponents thereof (e.g., one or more processors, one or more memories), may communicate, directly or indirectly, with one another (e.g., via one or more buses).

The communications manager 820 may support wireless communication in accordance with examples as disclosed herein. The control message component 825 is capable of, configured to, or operable to support a means for transmitting a control message indicating a quantity of parallel processes supported at the UE, the quantity of parallel processes associated with each of a quantity of sub-iterations of a successive non-linear distortion correction process. The scheduling configuration component 830 is capable of, configured to, or operable to support a means for receiving, based on the control message, a scheduling configuration message indicating a schedule for performing respective subsets of a set of non-linear estimation processes during each sub-iteration of the quantity of sub-iterations of the successive non-linear distortion correction process. The estimation component 835 is capable of, configured to, or operable to support a means for performing, in accordance with the schedule, the respective subsets of the set of non-linear estimation processes during the quantity of sub-iterations of the successive non-linear distortion correction process.

In some examples, the capability component 840 is capable of, configured to, or operable to support a means for transmitting a capability message indicating a capability of the UE associated with performing the successive non-linear distortion correction process, where the quantity of parallel processes supported at the UE is based on the capability of the UE.

In some examples, the signal component 845 is capable of, configured to, or operable to support a means for receiving a first signal including one or more first symbols, where performing the respective subsets of the set of non-linear estimation processes is based on estimating one or more second symbols of a second signal transmitted by a network entity and corresponding to the one or more first symbols of the first signal.

In some examples, the symbol correction component 850 is capable of, configured to, or operable to support a means for at least partially correcting, during each sub-iteration of the quantity of sub-iterations of the successive non-linear distortion correction process, an amplitude and phase of a first symbol of the one or more first symbols based on performing a respective subset of the set of non-linear estimation processes.

In some examples, the estimation component 835 is capable of, configured to, or operable to support a means for performing respective subsets of a second set of non-linear estimation processes during the quantity of sub-iterations, where each non-linear estimation process of a first subset of the second set of non-linear estimation processes is based on a respective non-linear estimation process of a second subset of the set of non-linear estimation processes, where the first subset is performed during a first sub-iteration of the quantity of sub-iterations and the second subset is performed during a second sub-iteration before the first sub-iteration.

In some examples, the estimation component 835 is capable of, configured to, or operable to support a means for performing respective subsets of a third set of linear estimation processes during the quantity of sub-iterations of the successive non-linear distortion correction process, where each linear estimation process of the third set of linear estimation processes is associated with estimating a respective scalar coefficient value.

In some examples, the quantity of parallel processes supported at the UE is based on a threshold latency value, a threshold power value, a threshold complexity value, or any combination thereof. In some examples, the schedule is based on one or more parameters associated with one or more transmission lanes of a network entity. In some examples, the schedule is based on the quantity of parallel processes supported at the UE. In some examples, the set of non-linear estimation processes includes one or more non-linear kernel projection processes, one or more Fourier transform processes, and one or more inverse Fourier transform processes.

Figure 9:
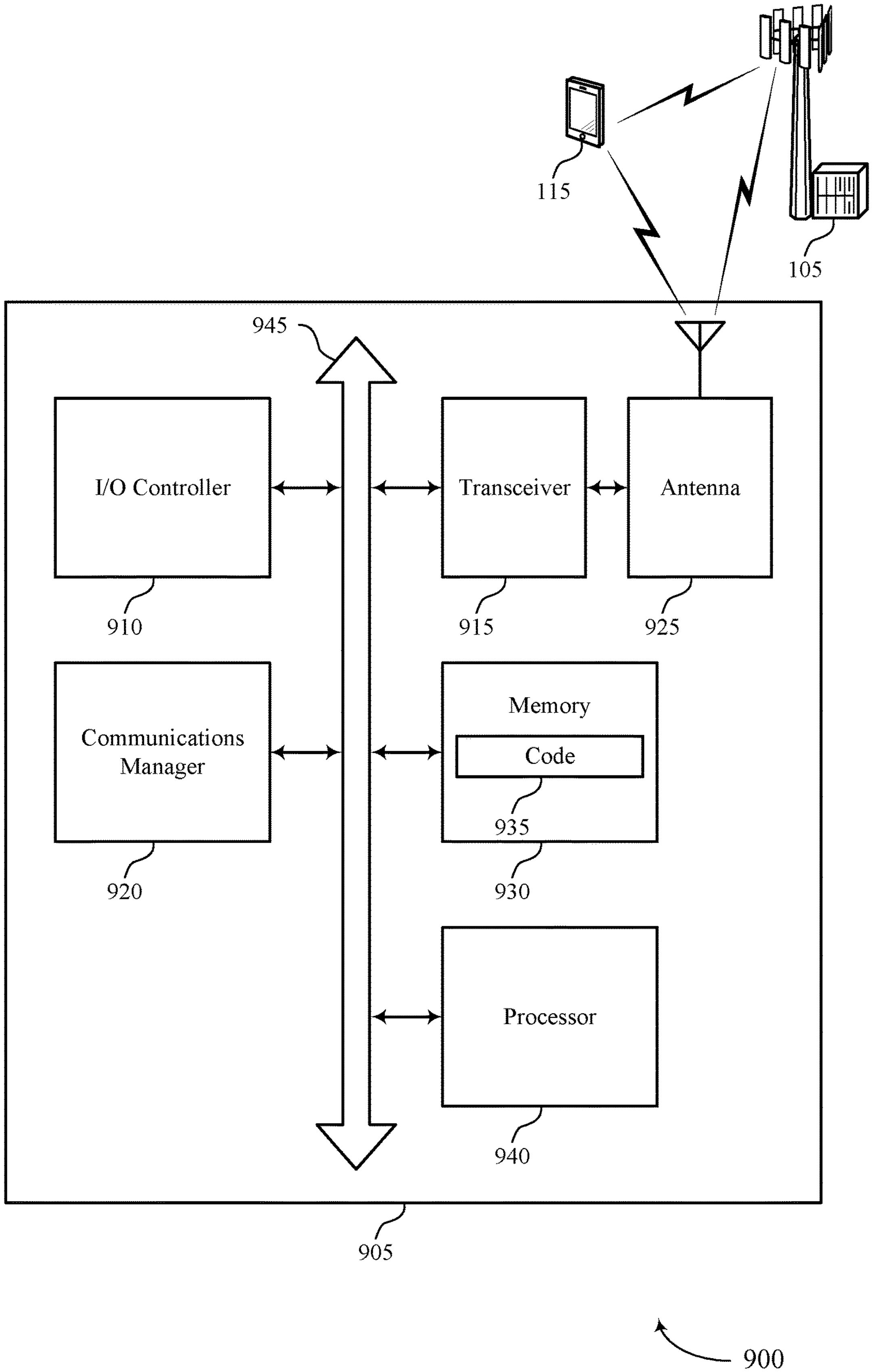
FIG. 9 shows a diagram of a system including a device that supports successive DPoD correction in accordance with one or more aspects of the present disclosure.

FIG. 9 shows a diagram of a system 900 including a device 905 that supports successive DPoD correction in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting successive DPoD correction). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communication in accordance with examples as disclosed herein. For example, the communications manager 920 is capable of, configured to, or operable to support a means for transmitting a control message indicating a quantity of parallel processes supported at the UE, the quantity of parallel processes associated with each of a quantity of sub-iterations of a successive non-linear distortion correction process. The communications manager 920 is capable of, configured to, or operable to support a means for receiving, based on the control message, a scheduling configuration message indicating a schedule for performing respective subsets of a set of non-linear estimation processes during each sub-iteration of the quantity of sub-iterations of the successive non-linear distortion correction process. The communications manager 920 is capable of, configured to, or operable to support a means for performing, in accordance with the schedule, the respective subsets of the set of non-linear estimation processes during the quantity of sub-iterations of the successive non-linear distortion correction process.

By including or configuring the communications manager 920 in accordance with examples as described herein, the device 905 may support techniques for reduced latency, reduced power consumption, more efficient utilization of communication resources, improved performance in signaling and decoding, and improved utilization of processing capability including reduction in complexity of calculations by performing batches of non-linear correction processes during sub-iterations of a DPoD correction process.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of successive DPoD correction as described herein, or the at least one processor 940 and the at least one memory 930 may be otherwise configured to, individually or collectively, perform or support such operations.

Figure 10:
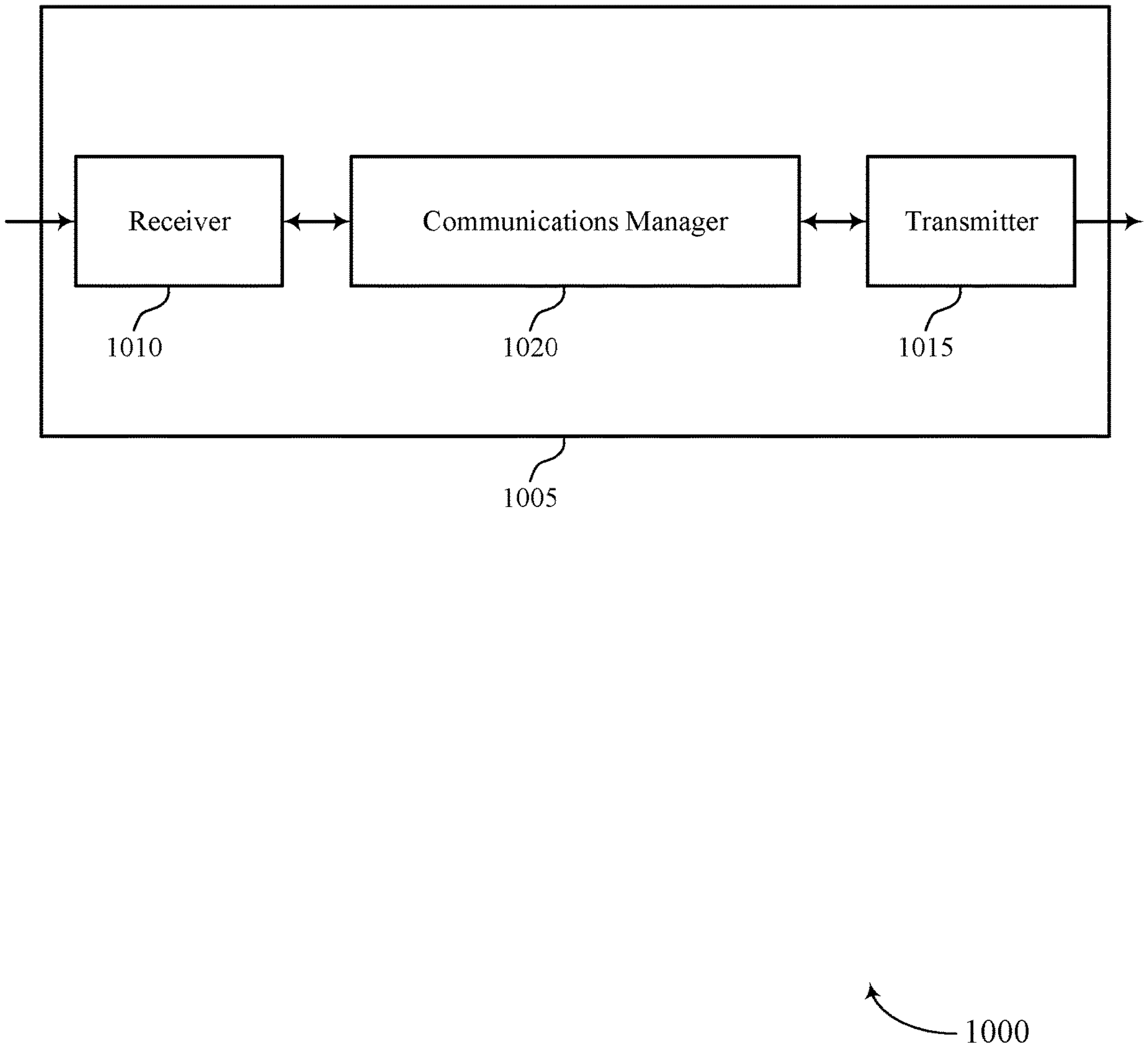
FIGS. 10 and 11 show block diagrams of devices that support successive DPoD correction in accordance with one or more aspects of the present disclosure.

FIG. 10 shows a block diagram 1000 of a device 1005 that supports successive DPoD correction in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of successive DPoD correction as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. For example, the communications manager 1020 is capable of, configured to, or operable to support a means for obtaining a control message indicating a quantity of parallel processes supported at a UE, the quantity of parallel processes associated with each of a quantity of sub-iterations of a successive non-linear distortion correction process. The communications manager 1020 is capable of, configured to, or operable to support a means for outputting, based on the control message, a scheduling configuration message indicating a schedule for performing respective subsets of a set of non-linear estimation processes during each sub-iteration of the quantity of sub-iterations of the successive non-linear distortion correction process.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced complexity in calculations, reduced power consumption, and more efficient utilization of communication resources by performing batches of non-linear correction processes during sub-iterations of a DPoD correction process.

Figure 11:
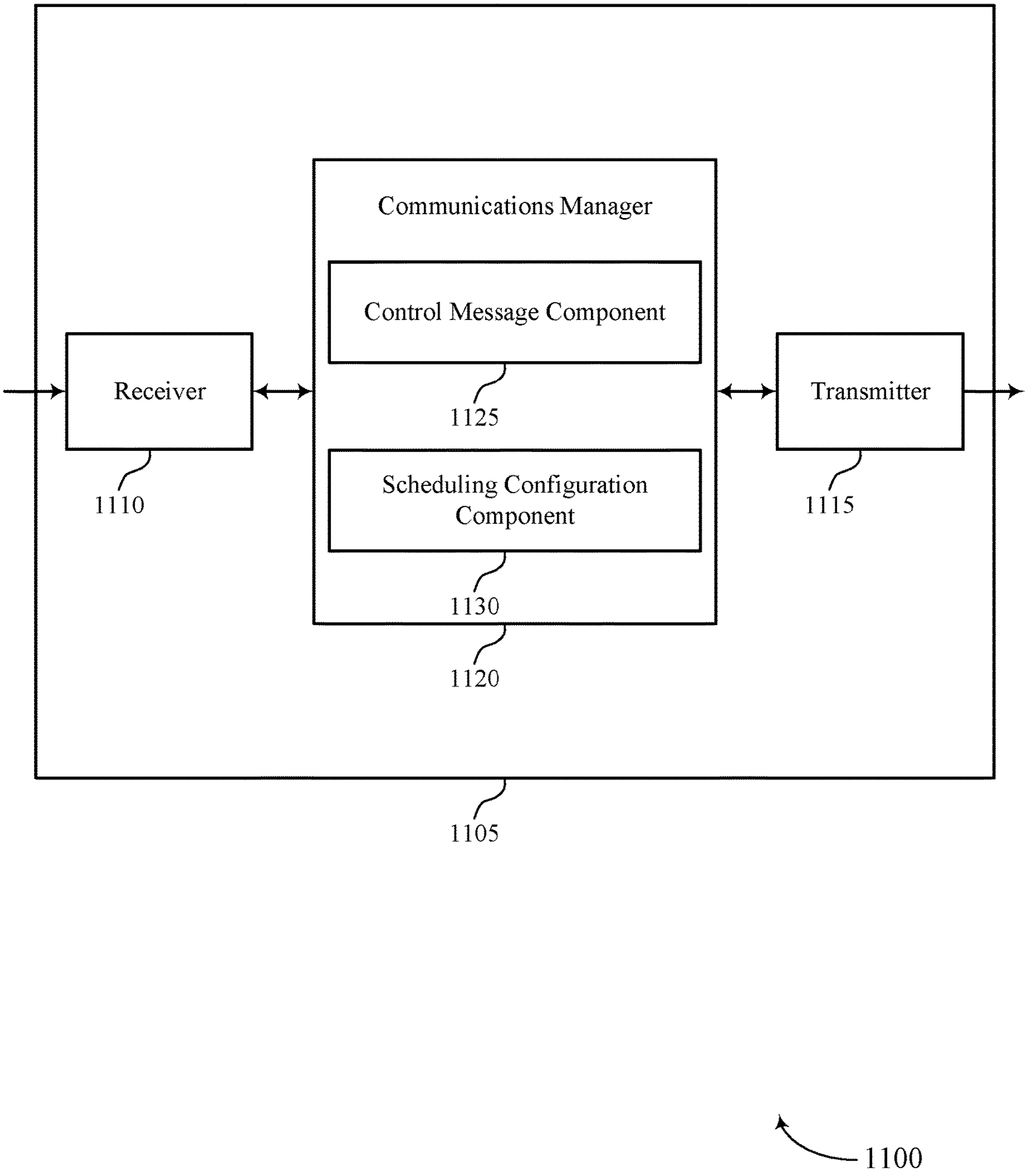

FIG. 11 shows a block diagram 1100 of a device 1105 that supports successive DPoD correction in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of successive DPoD correction as described herein. For example, the communications manager 1120 may include a control message component 1125 a scheduling configuration component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. The control message component 1125 is capable of, configured to, or operable to support a means for obtaining a control message indicating a quantity of parallel processes supported at a UE, the quantity of parallel processes associated with each of a quantity of sub-iterations of a successive non-linear distortion correction process. The scheduling configuration component 1130 is capable of, configured to, or operable to support a means for outputting, based on the control message, a scheduling configuration message indicating a schedule for performing respective subsets of a set of non-linear estimation processes during each sub-iteration of the quantity of sub-iterations of the successive non-linear distortion correction process.

Figure 12:
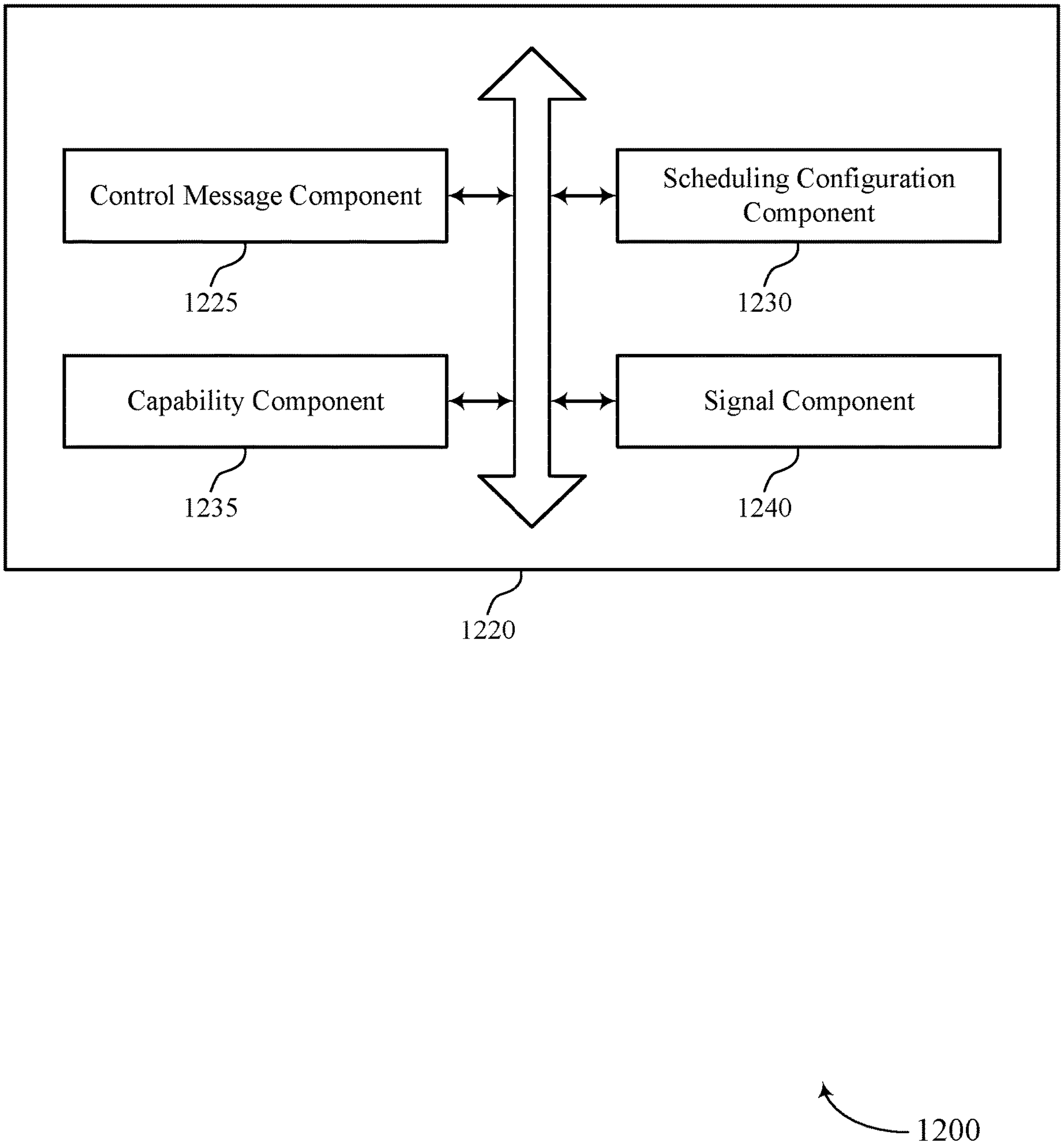
FIG. 12 shows a block diagram of a communications manager that supports successive DPoD correction in accordance with one or more aspects of the present disclosure.

FIG. 12 shows a block diagram 1200 of a communications manager 1220 that supports successive DPoD correction in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of successive DPoD correction as described herein. For example, the communications manager 1220 may include a control message component 1225, a scheduling configuration component 1230, a capability component 1235, a signal component 1240, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication in accordance with examples as disclosed herein. The control message component 1225 is capable of, configured to, or operable to support a means for obtaining a control message indicating a quantity of parallel processes supported at a UE, the quantity of parallel processes associated with each of a quantity of sub-iterations of a successive non-linear distortion correction process. The scheduling configuration component 1230 is capable of, configured to, or operable to support a means for outputting, based on the control message, a scheduling configuration message indicating a schedule for performing respective subsets of a set of non-linear estimation processes during each sub-iteration of the quantity of sub-iterations of the successive non-linear distortion correction process.

In some examples, the capability component 1235 is capable of, configured to, or operable to support a means for obtaining a capability message indicating a capability of the UE associated with performing the successive non-linear distortion correction process, where the quantity of parallel processes supported at the UE is based on the capability of the UE.

In some examples, the signal component 1240 is capable of, configured to, or operable to support a means for outputting a first signal including one or more symbols, the first signal associated with the quantity of parallel processes and the quantity of sub-iterations of the successive non-linear distortion correction process.

In some examples, the schedule is based on one or more parameters associated with one or more transmission lanes of the network entity. In some examples, the schedule is based on the quantity of parallel processes supported at the UE. In some examples, the set of non-linear estimation processes includes one or more non-linear kernel projection processes, one or more Fourier transform processes, and one or more inverse Fourier transform processes.

Figure 13:
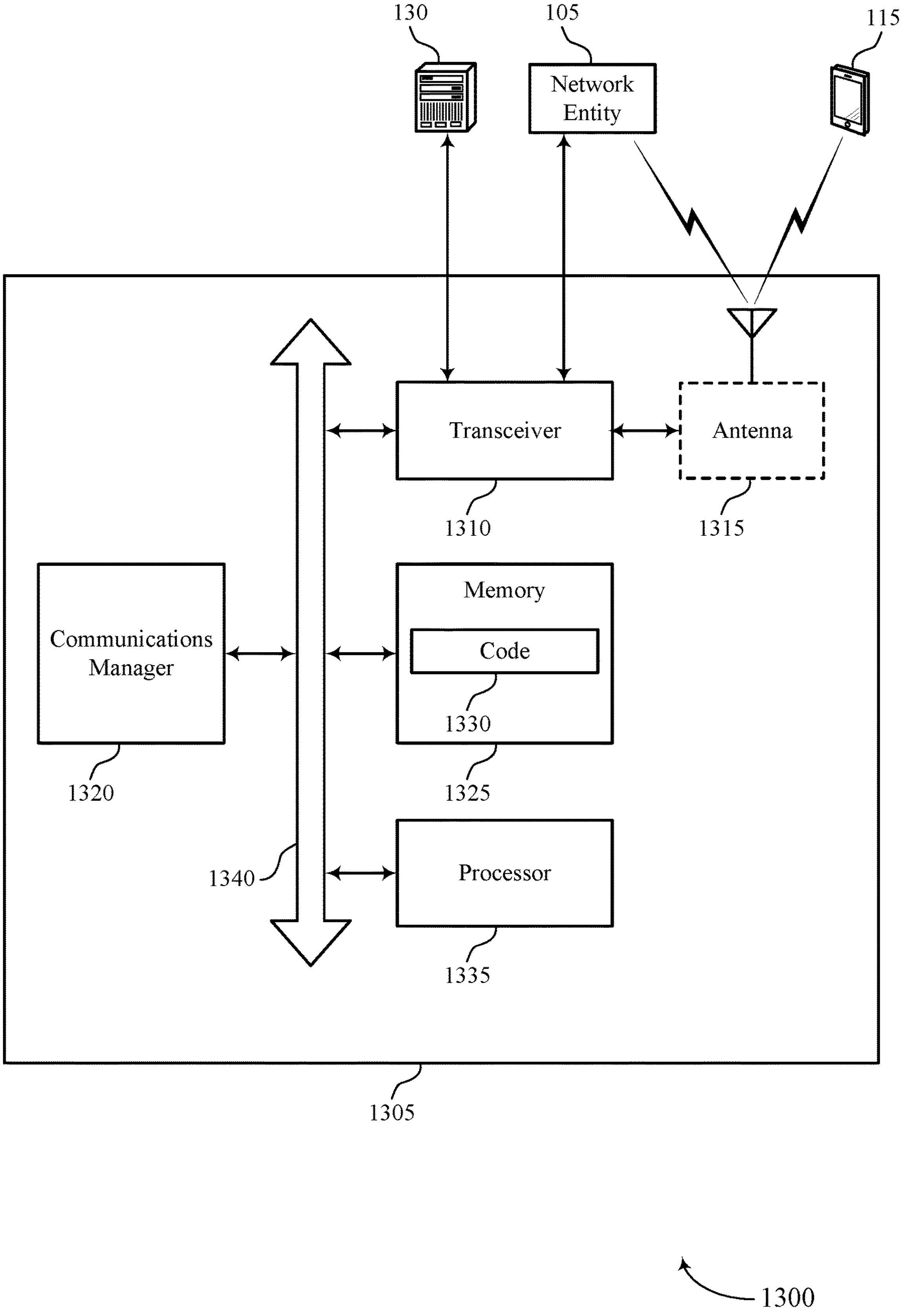
FIG. 13 shows a diagram of a system including a device that supports successive DPoD correction in accordance with one or more aspects of the present disclosure.

FIG. 13 shows a diagram of a system 1300 including a device 1305 that supports successive DPoD correction in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting successive DPoD correction). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication in accordance with examples as disclosed herein. For example, the communications manager 1320 is capable of, configured to, or operable to support a means for obtaining a control message indicating a quantity of parallel processes supported at a UE, the quantity of parallel processes associated with each of a quantity of sub-iterations of a successive non-linear distortion correction process. The communications manager 1320 is capable of, configured to, or operable to support a means for outputting, based on the control message, a scheduling configuration message indicating a schedule for performing respective subsets of a set of non-linear estimation processes during each sub-iteration of the quantity of sub-iterations of the successive non-linear distortion correction process.

By including or configuring the communications manager 1320 in accordance with examples as described herein, the device 1305 may support techniques for reduced latency, reduced power consumption, more efficient utilization of communication resources, improved performance in signaling and decoding, and improved utilization of processing capability including reduction in complexity of calculations by performing batches of non-linear correction processes during sub-iterations of a DPoD correction process.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of successive DPoD correction as described herein, or the at least one processor 1335 and the at least one memory 1325 may be otherwise configured to, individually or collectively, perform or support such operations.

Figure 14:
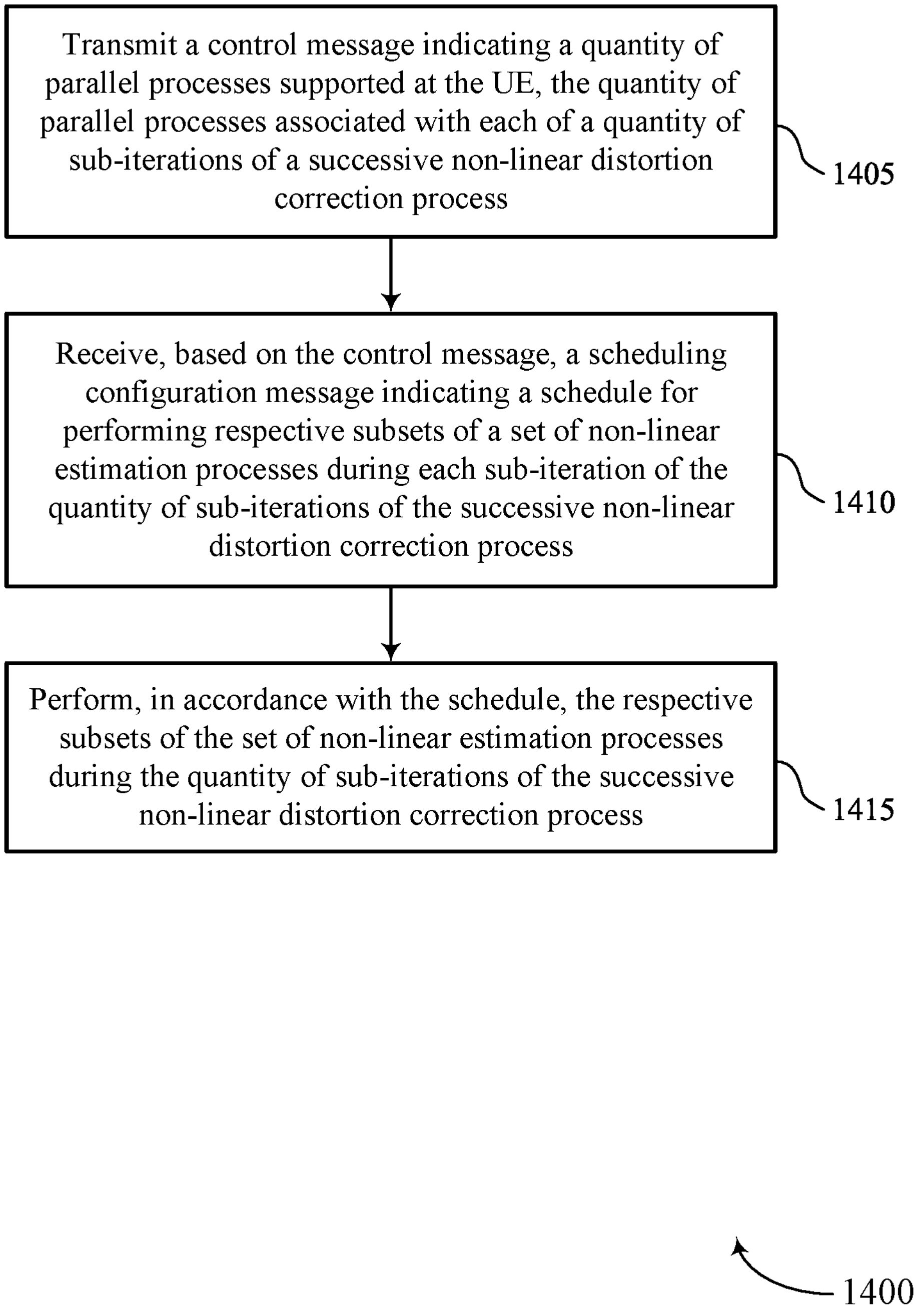
FIGS. 14 through 17 show flowcharts illustrating methods that support successive DPoD correction in accordance with one or more aspects of the present disclosure.

FIG. 14 shows a flowchart illustrating a method 1400 that supports successive DPoD correction in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include transmitting a control message indicating a quantity of parallel processes supported at the UE, the quantity of parallel processes associated with each of a quantity of sub-iterations of a successive non-linear distortion correction process. The operations of block 1405 may be performed in accordance with examples as disclosed herein. In some examples, aspects of the operations of 1405 may be performed by a control message component 825 as described with reference to FIG. 8.

At 1410, the method may include receiving, based on the control message, a scheduling configuration message indicating a schedule for performing respective subsets of a set of non-linear estimation processes during each sub-iteration of the quantity of sub-iterations of the successive non-linear distortion correction process. The operations of block 1410 may be performed in accordance with examples as disclosed herein. In some examples, aspects of the operations of 1410 may be performed by a scheduling configuration component 830 as described with reference to FIG. 8.

At 1415, the method may include performing, in accordance with the schedule, the respective subsets of the set of non-linear estimation processes during the quantity of sub-iterations of the successive non-linear distortion correction process. The operations of block 1415 may be performed in accordance with examples as disclosed herein. In some examples, aspects of the operations of 1415 may be performed by an estimation component 835 as described with reference to FIG. 8.

Figure 15:
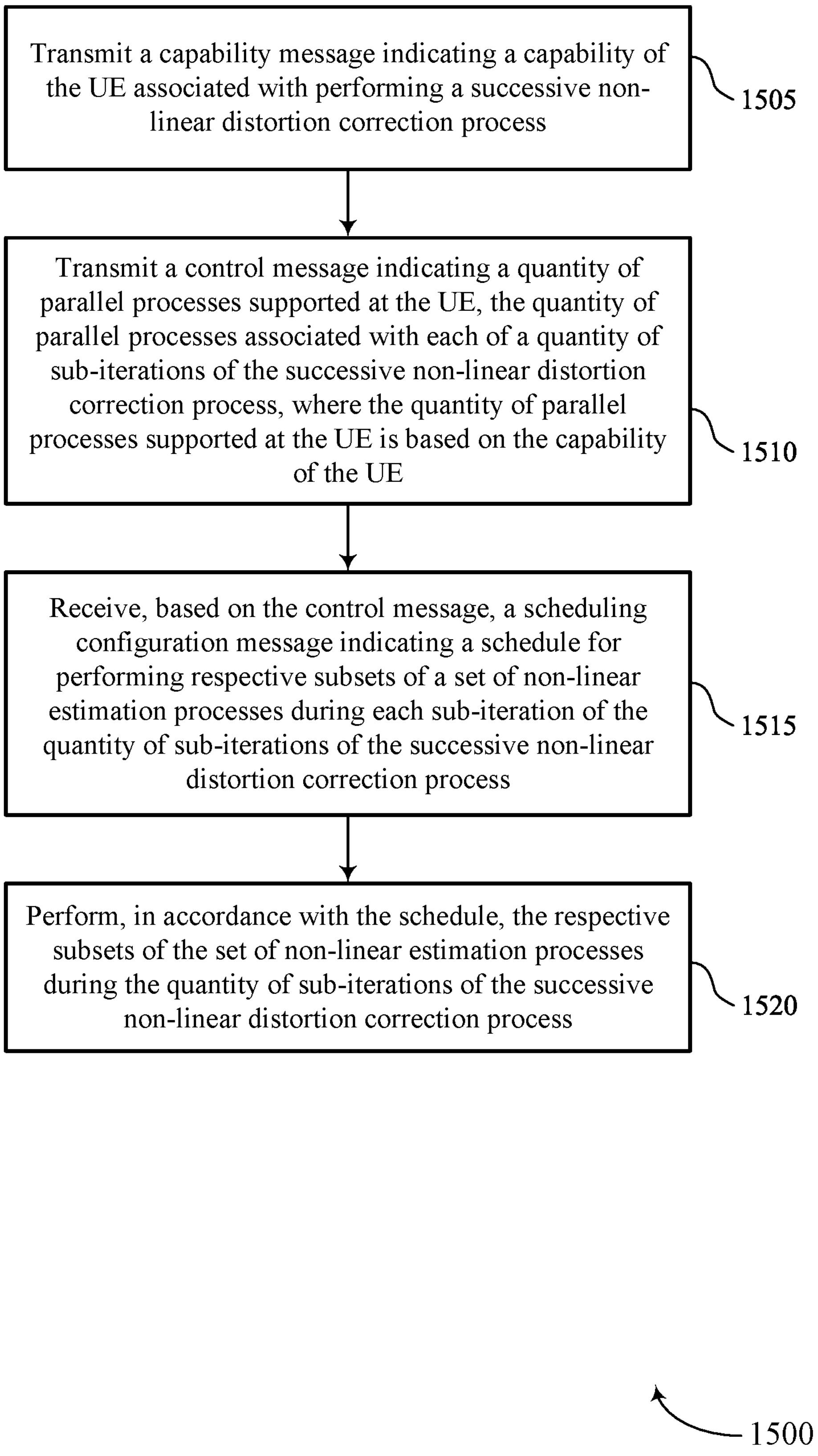

FIG. 15 shows a flowchart illustrating a method 1500 that supports successive DPoD correction in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting a capability message indicating a capability of the UE associated with performing a successive non-linear distortion correction process. The operations of block 1505 may be performed in accordance with examples as disclosed herein. In some examples, aspects of the operations of 1505 may be performed by a capability component 840 as described with reference to FIG. 8.

At 1510, the method may include transmitting a control message indicating a quantity of parallel processes supported at the UE, the quantity of parallel processes associated with each of a quantity of sub-iterations of the successive non-linear distortion correction process, where the quantity of parallel processes supported at the UE is based on the capability of the UE. The operations of block 1510 may be performed in accordance with examples as disclosed herein. In some examples, aspects of the operations of 1510 may be performed by a control message component 825 as described with reference to FIG. 8.

At 1515, the method may include receiving, based on the control message, a scheduling configuration message indicating a schedule for performing respective subsets of a set of non-linear estimation processes during each sub-iteration of the quantity of sub-iterations of the successive non-linear distortion correction process. The operations of block 1515 may be performed in accordance with examples as disclosed herein. In some examples, aspects of the operations of 1515 may be performed by a scheduling configuration component 830 as described with reference to FIG. 8.

At 1520, the method may include performing, in accordance with the schedule, the respective subsets of the set of non-linear estimation processes during the quantity of sub-iterations of the successive non-linear distortion correction process. The operations of block 1520 may be performed in accordance with examples as disclosed herein. In some examples, aspects of the operations of 1520 may be performed by an estimation component 835 as described with reference to FIG. 8.

Figure 16:
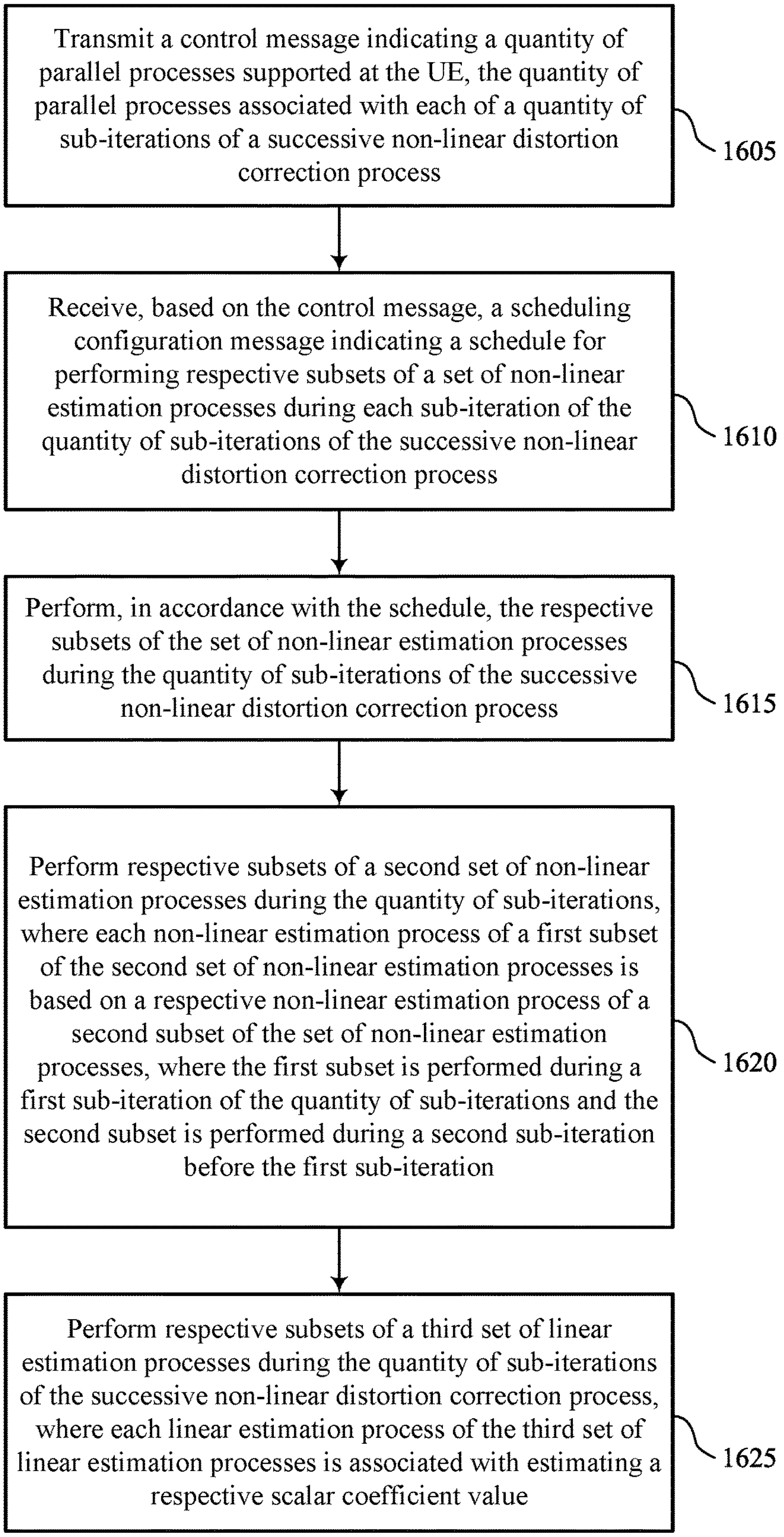

FIG. 16 shows a flowchart illustrating a method 1600 that supports successive DPoD correction in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include transmitting a control message indicating a quantity of parallel processes supported at the UE, the quantity of parallel processes associated with each of a quantity of sub-iterations of a successive non-linear distortion correction process. The operations of block 1605 may be performed in accordance with examples as disclosed herein. In some examples, aspects of the operations of 1605 may be performed by a control message component 825 as described with reference to FIG. 8.

At 1610, the method may include receiving, based on the control message, a scheduling configuration message indicating a schedule for performing respective subsets of a set of non-linear estimation processes during each sub-iteration of the quantity of sub-iterations of the successive non-linear distortion correction process. The operations of block 1610 may be performed in accordance with examples as disclosed herein. In some examples, aspects of the operations of 1610 may be performed by a scheduling configuration component 830 as described with reference to FIG. 8.

At 1615, the method may include performing, in accordance with the schedule, the respective subsets of the set of non-linear estimation processes during the quantity of sub-iterations of the successive non-linear distortion correction process. The operations of block 1615 may be performed in accordance with examples as disclosed herein. In some examples, aspects of the operations of 1615 may be performed by an estimation component 835 as described with reference to FIG. 8.

At 1620, the method may include performing respective subsets of a second set of non-linear estimation processes during the quantity of sub-iterations, where each non-linear estimation process of a first subset of the second set of non-linear estimation processes is based on a respective non-linear estimation process of a second subset of the set of non-linear estimation processes, where the first subset is performed during a first sub-iteration of the quantity of sub-iterations and the second subset is performed during a second sub-iteration before the first sub-iteration. The operations of block 1620 may be performed in accordance with examples as disclosed herein. In some examples, aspects of the operations of 1620 may be performed by an estimation component 835 as described with reference to FIG. 8.

At 1625, the method may include performing respective subsets of a third set of linear estimation processes during the quantity of sub-iterations of the successive non-linear distortion correction process, where each linear estimation process of the third set of linear estimation processes is associated with estimating a respective scalar coefficient value. The operations of block 1625 may be performed in accordance with examples as disclosed herein. In some examples, aspects of the operations of 1625 may be performed by an estimation component 835 as described with reference to FIG. 8.

Figure 17:
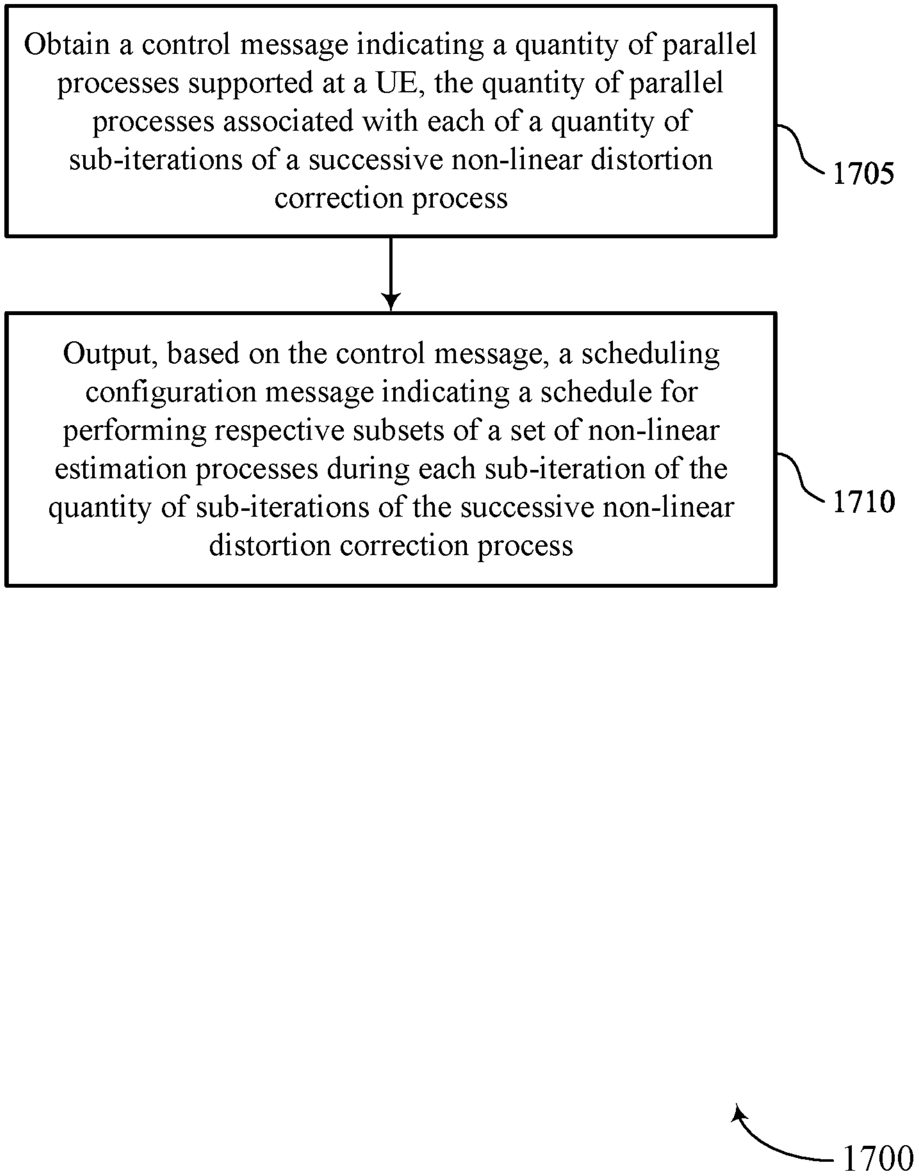

FIG. 17 shows a flowchart illustrating a method 1700 that supports successive DPoD correction in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include obtaining a control message indicating a quantity of parallel processes supported at a UE, the quantity of parallel processes associated with each of a quantity of sub-iterations of a successive non-linear distortion correction process. The operations of block 1705 may be performed in accordance with examples as disclosed herein. In some examples, aspects of the operations of 1705 may be performed by a control message component 1225 as described with reference to FIG. 12.

At 1710, the method may include outputting, based on the control message, a scheduling configuration message indicating a schedule for performing respective subsets of a set of non-linear estimation processes during each sub-iteration of the quantity of sub-iterations of the successive non-linear distortion correction process. The operations of block 1710 may be performed in accordance with examples as disclosed herein. In some examples, aspects of the operations of 1710 may be performed by a scheduling configuration component 1230 as described with reference to FIG. 12.

The following provides an overview of aspects of the present disclosure:

Aspect 1: A method for wireless communication by a UE, comprising: transmitting a control message indicating a quantity of parallel processes supported at the UE, the quantity of parallel processes associated with each of a quantity of sub iterations of a successive non-linear distortion correction process; receiving, based at least in part on the control message, a scheduling configuration message indicating a schedule for performing respective subsets of a set of non-linear estimation processes during each sub-iteration of the quantity of sub-iterations of the successive non-linear distortion correction process; and performing, in accordance with the schedule, the respective subsets of the set of non-linear estimation processes during the quantity of sub-iterations of the successive non-linear distortion correction process.

Aspect 2: The method of aspect 1, further comprising: transmitting a capability message indicating a capability of the UE associated with performing the successive non-linear distortion correction process, wherein the quantity of parallel processes supported at the UE is based at least in part on the capability of the UE.

Aspect 3: The method of any of aspects 1 through 2, further comprising: receiving a first signal comprising one or more first symbols, wherein performing the respective subsets of the set of non-linear estimation processes is based at least in part on estimating one or more second symbols of a second signal transmitted by a network entity and corresponding to the one or more first symbols of the first signal.

Aspect 4: The method of aspect 3, further comprising: at least partially correcting, during each sub-iteration of the quantity of sub-iterations of the successive non-linear distortion correction process, an amplitude and phase of a first symbol of the one or more first symbols based at least in part on performing a respective subset of the set of non-linear estimation processes.

Aspect 5: The method of any of aspects 1 through 4, further comprising: performing respective subsets of a second set of non-linear estimation processes during the quantity of sub-iterations, wherein each non-linear estimation process of a first subset of the second set of non-linear estimation processes is based at least in part on a respective non-linear estimation process of a second subset of the set of non-linear estimation processes, wherein the first subset is performed during a first sub-iteration of the quantity of sub-iterations and the second subset is performed during a second sub-iteration before the first sub-iteration.

Aspect 6: The method of any of aspects 1 through 5, further comprising: performing respective subsets of a third set of linear estimation processes during the quantity of sub-iterations of the successive non-linear distortion correction process, wherein each linear estimation process of the third set of linear estimation processes is associated with estimating a respective scalar coefficient value.

Aspect 7: The method of any of aspects 1 through 6, wherein the quantity of parallel processes supported at the UE is based at least in part on a threshold latency value, a threshold power value, a threshold complexity value, or any combination thereof.

Aspect 8: The method of any of aspects 1 through 7, wherein the schedule is based at least in part on one or more parameters associated with one or more transmission lanes of a network entity.

Aspect 9: The method of any of aspects 1 through 8, wherein the schedule is based at least in part on the quantity of parallel processes supported at the UE.

Aspect 10: The method of any of aspects 1 through 9, wherein the set of non-linear estimation processes comprises one or more non-linear kernel projection processes, one or more Fourier transform processes, and one or more inverse Fourier transform processes.

Aspect 11: A method for wireless communication by a network entity, comprising: obtaining a control message indicating a quantity of parallel processes supported at a UE, the quantity of parallel processes associated with each of a quantity of sub iterations of a successive non-linear distortion correction process; and outputting, based at least in part on the control message, a scheduling configuration message indicating a schedule for performing respective subsets of a set of non-linear estimation processes during each sub-iteration of the quantity of sub-iterations of the successive non-linear distortion correction process.

Aspect 12: The method of aspect 11, further comprising: obtaining a capability message indicating a capability of the UE associated with performing the successive non-linear distortion correction process, wherein the quantity of parallel processes supported at the UE is based at least in part on the capability of the UE.

Aspect 13: The method of any of aspects 11 through 12, further comprising: outputting a first signal comprising one or more symbols, the first signal associated with the quantity of parallel processes and the quantity of sub iterations of the successive non-linear distortion correction process.

Aspect 14: The method of any of aspects 11 through 13, wherein the schedule is based at least in part on one or more parameters associated with one or more transmission lanes of the network entity.

Aspect 15: The method of any of aspects 11 through 14, wherein the schedule is based at least in part on the quantity of parallel processes supported at the UE.

Aspect 16: The method of any of aspects 11 through 15, wherein the set of non-linear estimation processes comprises one or more non-linear kernel projection processes, one or more Fourier transform processes, and one or more inverse Fourier transform processes.

Aspect 17: A UE for wireless communication, comprising one or more memories storing processor-executable code, and one or more processors coupled with the one or more memories and individually or collectively operable to execute the code to cause the UE to perform a method of any of aspects 1 through 10.

Aspect 18: A UE for wireless communication, comprising at least one means for performing a method of any of aspects 1 through 10.

Aspect 19: A non-transitory computer-readable medium storing code for wireless communication, the code comprising instructions executable by one or more processors to perform a method of any of aspects 1 through 10.

Aspect 20: A network entity for wireless communication, comprising one or more memories storing processor-executable code, and one or more processors coupled with the one or more memories and individually or collectively operable to execute the code to cause the network entity to perform a method of any of aspects 11 through 16.

Aspect 21: A network entity for wireless communication, comprising at least one means for performing a method of any of aspects 11 through 16.

Aspect 22: A non-transitory computer-readable medium storing code for wireless communication, the code comprising instructions executable by one or more processors to perform a method of any of aspects 11 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, “or” as used in a list of items (e.g., a list of items prefaced by a phrase such as “at least one of” or “one or more of”) indicates an inclusive list such that, for example, a list of at least one of A, B, or C means A or B or C or AB or AC or BC or ABC (i.e., A and B and C). Also, as used herein, the phrase “based on” shall not be construed as a reference to a closed set of conditions. For example, an example step that is described as “based on condition A” may be based on both a condition A and a condition B without departing from the scope of the present disclosure. In other words, as used herein, the phrase “based on” shall be construed in the same manner as the phrase “based at least in part on.”

As used herein, including in the claims, the article “a” before a noun is open-ended and understood to refer to “at least one” of those nouns or “one or more” of those nouns. Thus, the terms “a,” “at least one,” “one or more,” “at least one of one or more” may be interchangeable. For example, if a claim recites “a component” that performs one or more functions, each of the individual functions may be performed by a single component or by any combination of multiple components. Thus, the term “a component” having characteristics or performing functions may refer to “at least one of one or more components” having a particular characteristic or performing a particular function. Subsequent reference to a component introduced with the article “a” using the terms “the” or “said” may refer to any or all of the one or more components. For example, a component introduced with the article “a” may be understood to mean “one or more components,” and referring to “the component” subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

transmit a control message indicating a quantity of parallel processes supported at the UE, the quantity of parallel processes associated with each of a quantity of sub-iterations of a successive non-linear distortion correction process;

receive, based at least in part on the control message, a scheduling configuration message indicating a schedule for performing respective subsets of a set of non-linear estimation processes during each sub-iteration of the quantity of sub-iterations of the successive non-linear distortion correction process; and perform, in accordance with the schedule, the respective subsets of the set of non-linear estimation processes during the quantity of sub-iterations of the successive non-linear distortion correction process.

2. The UE of claim 1, wherein the one or more processors are individually or collectively further operable to execute the code to cause the UE to:

transmit a capability message indicating a capability of the UE associated with performing the successive non-linear distortion correction process, wherein the quantity of parallel processes supported at the UE is based at least in part on the capability of the UE.

3. The UE of claim 1, wherein the one or more processors are individually or collectively further operable to execute the code to cause the UE to:

receive a first signal comprising one or more first symbols, wherein performing the respective subsets of the set of non-linear estimation processes is based at least in part on estimating one or more second symbols of a second signal transmitted by a network entity and corresponding to the one or more first symbols of the first signal.

4. The UE of claim 3, wherein the one or more processors are individually or collectively further operable to execute the code to cause the UE to:

at least partially correct, during each sub-iteration of the quantity of sub-iterations of the successive non-linear distortion correction process, an amplitude and phase of a first symbol of the one or more first symbols based at least in part on performing a respective subset of the set of non-linear estimation processes.

5. The UE of claim 1, wherein the one or more processors are individually or collectively further operable to execute the code to cause the UE to:

perform respective subsets of a second set of non-linear estimation processes during the quantity of sub-iterations, wherein each non-linear estimation process of a first subset of the second set of non-linear estimation processes is based at least in part on a respective non-linear estimation process of a second subset of the set of non-linear estimation processes, wherein the first subset is performed during a first sub-iteration of the quantity of sub-iterations and the second subset is performed during a second sub-iteration before the first sub-iteration.

6. The UE of claim 1, wherein the one or more processors are individually or collectively further operable to execute the code to cause the UE to:

perform respective subsets of a third set of linear estimation processes during the quantity of sub-iterations of the successive non-linear distortion correction process, wherein each linear estimation process of the third set of linear estimation processes is associated with estimating a respective scalar coefficient value.

7. The UE of claim 1, wherein the quantity of parallel processes supported at the UE is based at least in part on a threshold latency value, a threshold power value, a threshold complexity value, or any combination thereof.

8. The UE of claim 1, wherein the schedule is based at least in part on one or more parameters associated with one or more transmission lanes of a network entity.

9. The UE of claim 1, wherein the schedule is based at least in part on the quantity of parallel processes supported at the UE.

10. The UE of claim 1, wherein:

the set of non-linear estimation processes comprises one or more non-linear kernel projection processes, one or more Fourier transform processes, and one or more inverse Fourier transform processes.

11. A network entity, comprising:

one or more memories storing processor-executable code; and one or more processors coupled with the one or more memories and individually or collectively operable to execute the code to cause the network entity to:

obtain a control message indicating a quantity of parallel processes supported at a user equipment (UE), the quantity of parallel processes associated with each of a quantity of sub-iterations of a successive non-linear distortion correction process; and output, based at least in part on the control message, a scheduling configuration message indicating a schedule for performing respective subsets of a set of non-linear estimation processes during each sub-iteration of the quantity of sub-iterations of the successive non-linear distortion correction process.

12. The network entity of claim 11, wherein the one or more processors are individually or collectively further operable to execute the code to cause the network entity to:

obtain a capability message indicating a capability of the UE associated with performing the successive non-linear distortion correction process, wherein the quantity of parallel processes supported at the UE is based at least in part on the capability of the UE.

13. The network entity of claim 11, wherein the one or more processors are individually or collectively further operable to execute the code to cause the network entity to:

output a first signal comprising one or more symbols, the first signal associated with the quantity of parallel processes and the quantity of sub-iterations of the successive non-linear distortion correction process.

14. The network entity of claim 11, wherein the schedule is based at least in part on one or more parameters associated with one or more transmission lanes of the network entity.

15. The network entity of claim 11, wherein the schedule is based at least in part on the quantity of parallel processes supported at the UE.

16. The network entity of claim 11, wherein:

the set of non-linear estimation processes comprises one or more non-linear kernel projection processes, one or more Fourier transform processes, and one or more inverse Fourier transform processes.

17. A method for wireless communication by a user equipment (UE), comprising:

transmitting a control message indicating a quantity of parallel processes supported at the UE, the quantity of parallel processes associated with each of a quantity of sub-iterations of a successive non-linear distortion correction process;

receiving, based at least in part on the control message, a scheduling configuration message indicating a schedule for performing respective subsets of a set of non-linear estimation processes during each sub-iteration of the quantity of sub-iterations of the successive non-linear distortion correction process; and performing, in accordance with the schedule, the respective subsets of the set of non-linear estimation processes during the quantity of sub-iterations of the successive non-linear distortion correction process.

18. The method of claim 17, further comprising:

transmitting a capability message indicating a capability of the UE associated with performing the successive non-linear distortion correction process, wherein the quantity of parallel processes supported at the UE is based at least in part on the capability of the UE.

19. The method of claim 17, further comprising:

receiving a first signal comprising one or more first symbols, wherein performing the respective subsets of the set of non-linear estimation processes is based at least in part on estimating one or more second symbols of a second signal transmitted by a network entity and corresponding to the one or more first symbols of the first signal.

20. The method of claim 19, further comprising:

at least partially correcting, during each sub-iteration of the quantity of sub-iterations of the successive non-linear distortion correction process, an amplitude and phase of a first symbol of the one or more first symbols based at least in part on performing a respective subset of the set of non-linear estimation processes.

21. The method of claim 17, further comprising:

performing respective subsets of a second set of non-linear estimation processes during the quantity of sub-iterations, wherein each non-linear estimation process of a first subset of the second set of non-linear estimation processes is based at least in part on a respective non-linear estimation process of a second subset of the set of non-linear estimation processes, wherein the first subset is performed during a first sub-iteration of the quantity of sub-iterations and the second subset is performed during a second sub-iteration before the first sub-iteration.

22. The method of claim 17, further comprising:

performing respective subsets of a third set of linear estimation processes during the quantity of sub-iterations of the successive non-linear distortion correction process, wherein each linear estimation process of the third set of linear estimation processes is associated with estimating a respective scalar coefficient value.

23. The method of claim 17, wherein the quantity of parallel processes supported at the UE is based at least in part on a threshold latency value, a threshold power value, a threshold complexity value, or any combination thereof.

24. The method of claim 17, wherein the schedule is based at least in part on one or more parameters associated with one or more transmission lanes of a network entity.

25. The method of claim 17, wherein the schedule is based at least in part on the quantity of parallel processes supported at the UE.

26. The method of claim 17, wherein the set of non-linear estimation processes comprises one or more non-linear kernel projection processes, one or more Fourier transform processes, and one or more inverse Fourier transform processes.

27. A method for wireless communication by a network entity, comprising:

obtaining a control message indicating a quantity of parallel processes supported at a user equipment (UE), the quantity of parallel processes associated with each of a quantity of sub-iterations of a successive non-linear distortion correction process; and outputting, based at least in part on the control message, a scheduling configuration message indicating a schedule for performing respective subsets of a set of non-linear estimation processes during each sub-iteration of the quantity of sub-iterations of the successive non-linear distortion correction process.

28. The method of claim 27, further comprising:

obtaining a capability message indicating a capability of the UE associated with performing the successive non-linear distortion correction process, wherein the quantity of parallel processes supported at the UE is based at least in part on the capability of the UE.

29. The method of claim 27, further comprising:

outputting a first signal comprising one or more symbols, the first signal associated with the quantity of parallel processes and the quantity of sub-iterations of the successive non-linear distortion correction process.

30. The method of claim 27, wherein the schedule is based at least in part on one or more parameters associated with one or more transmission lanes of the network entity, the quantity of parallel processes supported at the UE, or both.

* * * * *